United States Patent [19]
Ledley et al.

[11] Patent Number: 4,769,698
[45] Date of Patent: Sep. 6, 1988

[54] INTERACTIVE MICROSCOPIC IMAGE DISPLAY SYSTEM AND METHOD

[75] Inventors: Robert S. Ledley, Silver Spring; Thomas J. Golab, Beltsville, both of Md.

[73] Assignee: National Biomedical Research Foundation, Washington, D.C.

[21] Appl. No.: 25,908

[22] Filed: Mar. 16, 1987

Related U.S. Application Data

[63] Continuation-in-part of Ser. No. 784,615, Oct. 4, 1985, Pat. No. 4,651,200, which is a continuation-in-part of Ser. No. 697,930, Feb. 4, 1985, Pat. No. 4,673,973.

[51] Int. Cl.$^4$ ............................................. H04N 7/18
[52] U.S. Cl. ..................................... 358/93; 350/505; 350/520; 350/531; 358/225; 358/903
[58] Field of Search ................. 358/93, 101, 107, 225, 358/227, 903; 350/504, 505, 519, 520, 529, 531

[56] References Cited

U.S. PATENT DOCUMENTS

| | | | |
|---|---|---|---|
| 2,527,719 | 10/1950 | Greenstein et al. | 350/558 |
| 2,685,820 | 8/1954 | Kaprelian | 350/505 |
| 2,699,092 | 1/1955 | Rantsch | 350/509 |
| 2,950,649 | 8/1960 | Horn | 350/509 |
| 3,030,861 | 4/1962 | Mortimer et al. | 350/414 |
| 3,057,259 | 10/1962 | Schuma | 350/414 |
| 3,353,891 | 11/1967 | Rosenberger | 350/519 |
| 3,397,656 | 8/1968 | Abarotin | 350/531 |
| 3,459,464 | 8/1969 | Smith | 350/511 |
| 3,488,104 | 1/1970 | Doherty | 350/511 |
| 3,503,684 | 3/1970 | Preston, Jr. et al. | 356/39 |
| 3,525,803 | 8/1970 | Smart | 358/93 |
| 3,835,246 | 9/1974 | Muller et al. | 358/93 |
| 3,871,741 | 3/1975 | Clave et al. | 350/511 |
| 3,883,869 | 5/1975 | Mansour et al. | 358/93 |
| 3,895,854 | 7/1975 | Ziffer | 350/511 |
| 4,199,785 | 4/1980 | McCullough et al. | 358/180 |
| 4,202,037 | 5/1980 | Glaser | 340/705 |
| 4,218,112 | 8/1980 | Ruker | 350/511 |
| 4,245,252 | 1/1981 | Nagumo | 358/183 |
| 4,389,669 | 6/1983 | Epstein | 358/107 |
| 4,440,475 | 4/1984 | Colliaux | 350/502 |
| 4,485,409 | 11/1984 | Schumacher | 358/93 |
| 4,538,177 | 8/1985 | Morison | 358/93 |
| 4,546,771 | 10/1985 | Eggleton et al. | 128/660 |
| 4,626,906 | 12/1986 | Ensor | 358/93 |
| 4,651,200 | 3/1987 | Ledley | 358/93 |
| 4,672,559 | 6/1987 | Jansson | 358/93 |
| 4,673,973 | 6/1987 | Ledley | 358/93 |
| 4,675,736 | 6/1987 | Lehmer | 358/183 |

FOREIGN PATENT DOCUMENTS 52-9455  1/1977  Japan .................. 350/529

*Primary Examiner*—Howard W. Britton
*Attorney, Agent, or Firm*—Joseph G. Seeber

[57] ABSTRACT

A system and method for interactively displaying magnified images of an object having different respective magnifications is disclosed. The system comprises a microscope stage for holding the object, an optical arrangement for magnifying an image of the object in accordance with different respective magnifications so as to produce first and second optical outputs in corresponding first and second optical paths with different respective magnifications in each path, first and second cameras disposed in the first and second paths, and display units for displaying the first and second images of the object magnified in accordance with the different respective magnifications. The system further includes a computer for processing operator inputs commanding movement of the first and second images, and movement control circuitry (including an interface circuit, a motor driver, and a position detector) for moving the images as commanded by the operator, and for keeping track of the position of the microscope stage, further movement being halted when predetermined position limits of the microscope stage are reached.

28 Claims, 18 Drawing Sheets

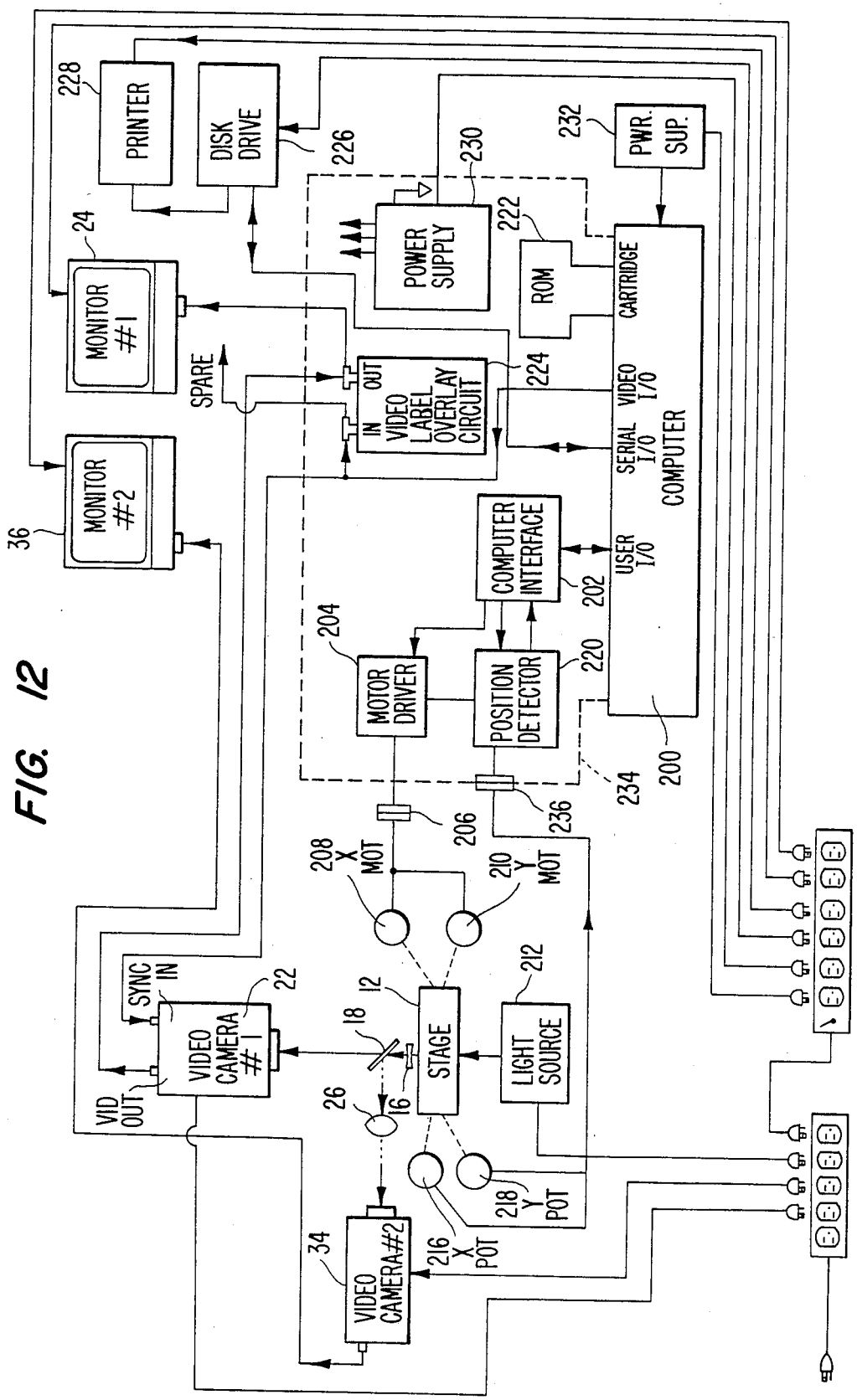

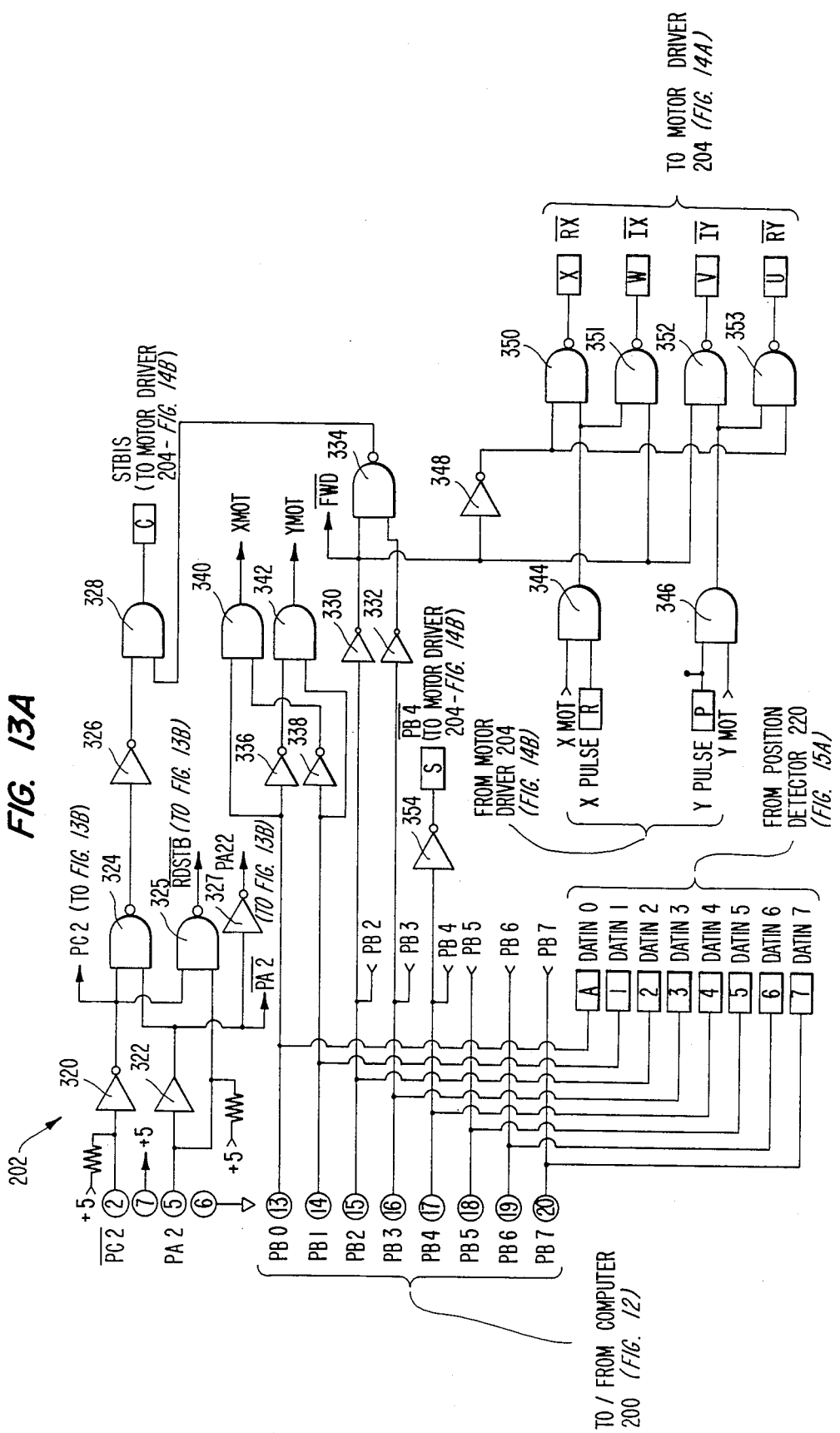

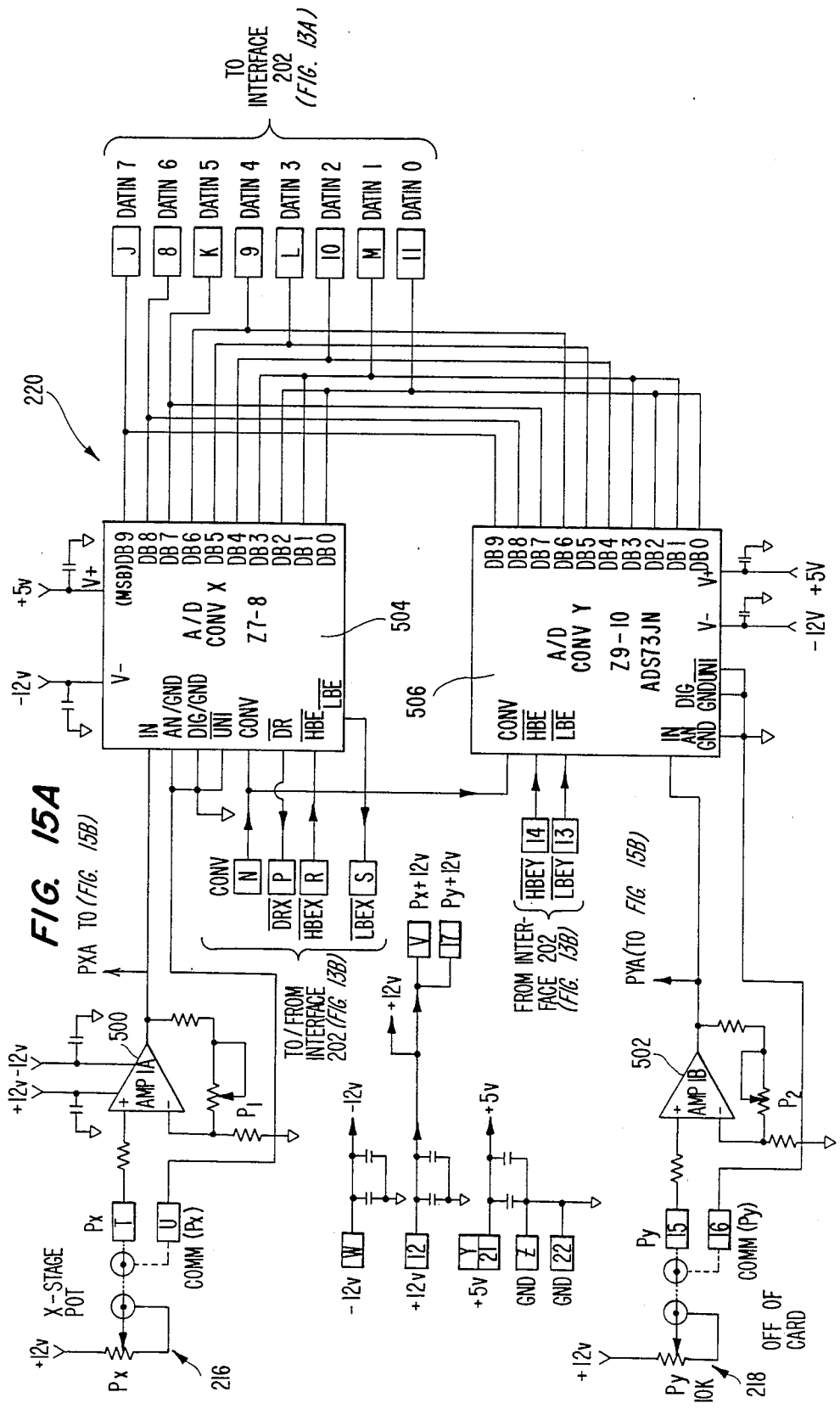

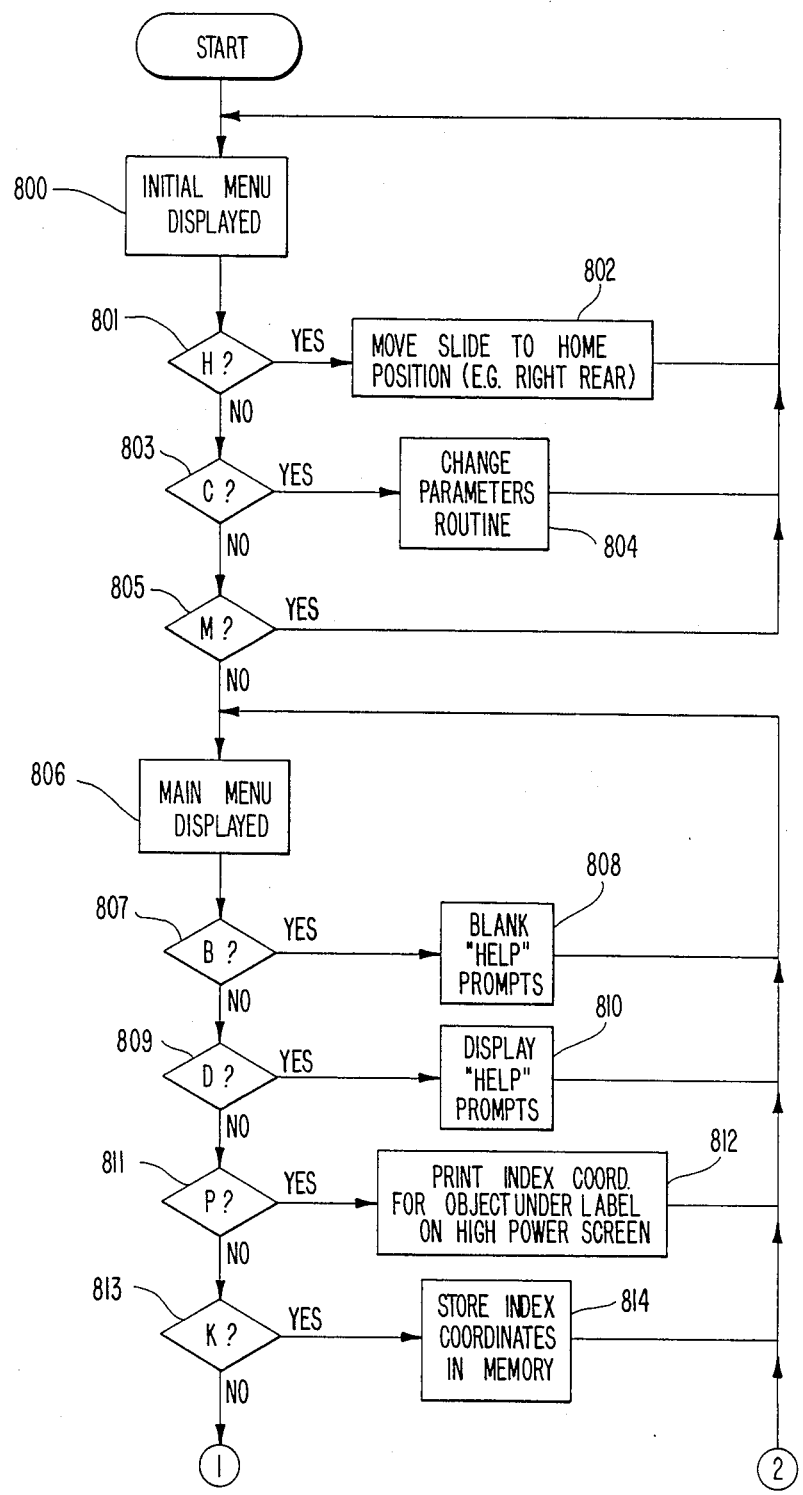

INTERACTIVE MICROSCOPIC IMAGE DISPLAY SYSTEM AND METHOD

REFERENCE TO RELATED APPLICATION

This is a continuation-in-part (CIP) of copending application U.S. Ser. No. 784,615, filed on Oct. 4, 1985, now U.S. Pat. No. 4,651,200, issued on Mar. 17, 1987, which is a CIP of copending application U.S. Ser. No. 697,930, filed on Feb. 4, 1985, now U.S. Pat. No. 4,673,973, issued on June 16, 1987.

TECHNICAL FIELD

The present invention relates to an interactive, split-image, multi-power microscopic image display system for use in viewing simultaneously two images of the same object or specimen, each image having a different magnification with respect to the other.

BACKGROUND ART

In certain microscopic viewing applications, such as microscopic examination of chromosomes, it is necessary for the technician to view a relatively larger area of the specimen under a lower magnification power in order to locate a particular smaller area to be viewed, and then to switch magnifications and refocus in order to view the smaller area of concern under a larger magnification. Much time is wasted performing these manipulations, and it is quite inefficient and inconvenient for the technician to have to refocus the microscope after switching to a higher magnification.

Accordingly, it would be considered highly desirable to provide a split-image microscopic image display system and method having multiple magnification powers, and it would especially be desirable to provide such a system with the capability of simultaneously viewing and displaying on two monitors both the larger area of general interest and the smaller area of specific interest, and of interactively manipulating the microscope stage carrying the viewed specimen so as to center or otherwise position the specimen in the viewing field(s). Moreover, it would also be considered desirable to provide such a system with the capability of producing, on operator command, a hardcopy of the images displayed on either of the monitors (the high-power monitor or the low-power monitor).

In some applications, it might be desirable to provide such a split-image, multi-power microscopic image display system and method with a type of lens switching apparatus whereby lenses of varying physical characteristics can be manually and yet easily employed as the objective lens in the microscopic image display system and method. However, as mentioned previously, the technology of the prior art is such as to require a refocusing of the microscope each time a new lens is switched into place for use as the objective. Therefore, it is considered desirable to provide a lens switching arrangement wherein refocusing is not required each time a new lens is switched into position.

The following U.S. patents are generally pertinent to the present invention: U.S. Pat. Nos. 2,527,719; 2,685,820; 2,699,092; 2,950,649; 3,030,861; 3,057,259; 3,353,891; 3,459,464; 3,488,104; 3,503,684; 3,525,803; 3,835,246; 3,871,741; 3,883,689; 3,895,854; 4,199,785; 4,218,112; 4,245,252; 4,440,475; and 4,546,771.

DISCLOSURE OF INVENTION

The present invention relates to an interactive split-image, multi-power microscopic image display system and method.

Specifically, the present invention relates to an interactive microscopic image display system and method wherein the optical image of a specimen is, as a result of the employment of a splitter, directed along two optical paths. In each embodiment of the invention, a first optical path includes a trinocular microscope head for operator viewing of the specimen during initial microscopic setup, in combination with a first TV camera to which the image is presented as an optical input and a first TV monitor connected to the first camera for producing a visual image of the specimen magnified in accordance with a first magnification power. The second optical path of each embodiment includes a bending prism for presenting to a second TV camera, as an optical input thereto, an image of the specimen magnified in accordance with a second magnification power, and a second TV monitor connected to the second TV camera for presenting a visual image thereof.

In a first embodiment of the invention, a relatively high power objective lens is employed to achieve a magnified image of the specimen in accordance with a higher magnification power, and a combination of lenses in the second optical path demagnifies the magnified image to provide an image of the specimen magnified in accordance with a lower magnification power.

In a second embodiment of the invention, a relatively low power objective or lithography lens is employed to achieve a magnified image of the specimen in accordance with a lower magnification power, and a magnification lens is provided in the first optical path to magnify the already magnified image so as to provide an image of the specimen magnified in accordance with a higher magnification power.

In a third embodiment of the invention, a relatively low power objective or lithography lens is employed to achieve a magnified image of the specimen in accordance with the lower magnification power, and one of the TV cameras is operated in such a way as to underscan the magnified image of the specimen so as to achieve a display, on the associated TV monitor, of a further magnified view of the magnified image of the specimen, thus effectively providing an image of the specimen magnified in accordance with the higher magnification power mentioned above.

In a fourth embodiment of the invention, a relatively low power objective or lithography lens is employed to achieve a magnified image of the specimen in accordance with the lower magnification power, a magnifying lens is employed in a first optical path so as to further magnify the image of the specimen, achieving magnification in accordance with a somewhat higher magnification power, and a further magnifying lens (or Barlow lens) is employed in a second optical path so as to achieve further magnification of the image of the specimen, resulting in magnification of the specimen in accordance with an even higher magnification power.

Preferably, the microscopic image display system and method of the present invention includes a microcomputer having an operator input means (such as a keyboard) for inputting information pertaining to the specimen being viewed, in combination with a mixer connected between the microcomputer and the TV camera(s), on the one hand, and the TV monitor(s), on the other hand, for displaying on the TV screen, as an inset, the information pertinent to the particular specimen being viewed. As a further preference, the microscopic image display system and method includes a slave monitor or monitors, each slave monitor being connected to an output of a respective one of the TV monitors, the system and method further including one or more respective photographic printers, each photographic printer being connected to a respective one of the slave monitors for producing a hardcopy record of the image being displayed at a particular time.

In accordance with a further feature of the invention, the microscopic image display system and method is truly interactive in that, by using the operator input means (such as a keyboard), the operator is able to modify the display of the specimen. More specifically, on an interactive basis, the operator is able to move the image of the specimen on the display screen(s) for the purpose of centering it or merely moving it to such a position as to facilitate viewing of a portion of the specimen, either alone or in combination with other portions of the specimen.

In accordance with a still further feature of the invention, the microscopic image display system and method is provided with an objective lens switching apparatus by means of which the operator can switchably employ two or more lenses of varying characteristics as the objective lens of the microscopic image display system and method. However, in accordance with this feature of the present invention, each time the operator switches the lens into position, it is not necessary for the operator to refocus the microscope.

Therefore, it is a primary object of the present invention to provide an interactive split-image, multi-power microscopic image display system and method.

It is an additional object of the present invention to provide a microscopic image display system and method having at least two optical paths, each optical path providing a visual image of a specimen magnified in accordance with a respective magnification power.

It is an additional object of the present invention to provide a microscopic image display system and method employing at least two TV cameras and at least two respectively associated TV monitors for viewing the respective magnified images of the specimen.

It is an additional object of the present invention to provide a microscopic image display system and method having the capability of producing a hardcopy record of the specimen being viewed.

It is an additional object of the present invention to provide a microscopic image display system and method wherein information relevant to the particular specimen being viewed can be electronically inserted into the TV signals so that it can be viewed simultaneously with the magnified image of the specimen.

It is an additional object of the present invention to provide a microscopic image display system and method which is truly interactive in that the operator is provided with the capability of moving or adjusting the position of the specimen being viewed on the display screen(s).

It is an additional object of the present invention to provide a microscopic image display system and method having a lens switching apparatus for providing the operator with the capability of switching various lenses into place without the need for refocusing after each lens switching operation.

The manner in which these and other objects are accomplished by the present invention will become clear from the following detailed description of a preferred embodiment.

BRIEF DESCRIPTION OF DRAWINGS

FIG. 12 is a detailed block diagram or cabling diagram of a preferred embodiment of the interactive microscopic image display system of the present invention.

FIGS. 13A and 13B are circuit diagrams of the computer interface of FIG. 12.

FIGS. 15A and 15B are circuit diagrams of the position detector of FIG. 12.

FIGS. 17A—17C are a flowchart of the operations performed by the computer of FIG. 12.

BEST MODE FOR CARRYING OUT THE INVENTION

The invention will now be described in more detail with reference to the figures of the drawings.

Figure 1:
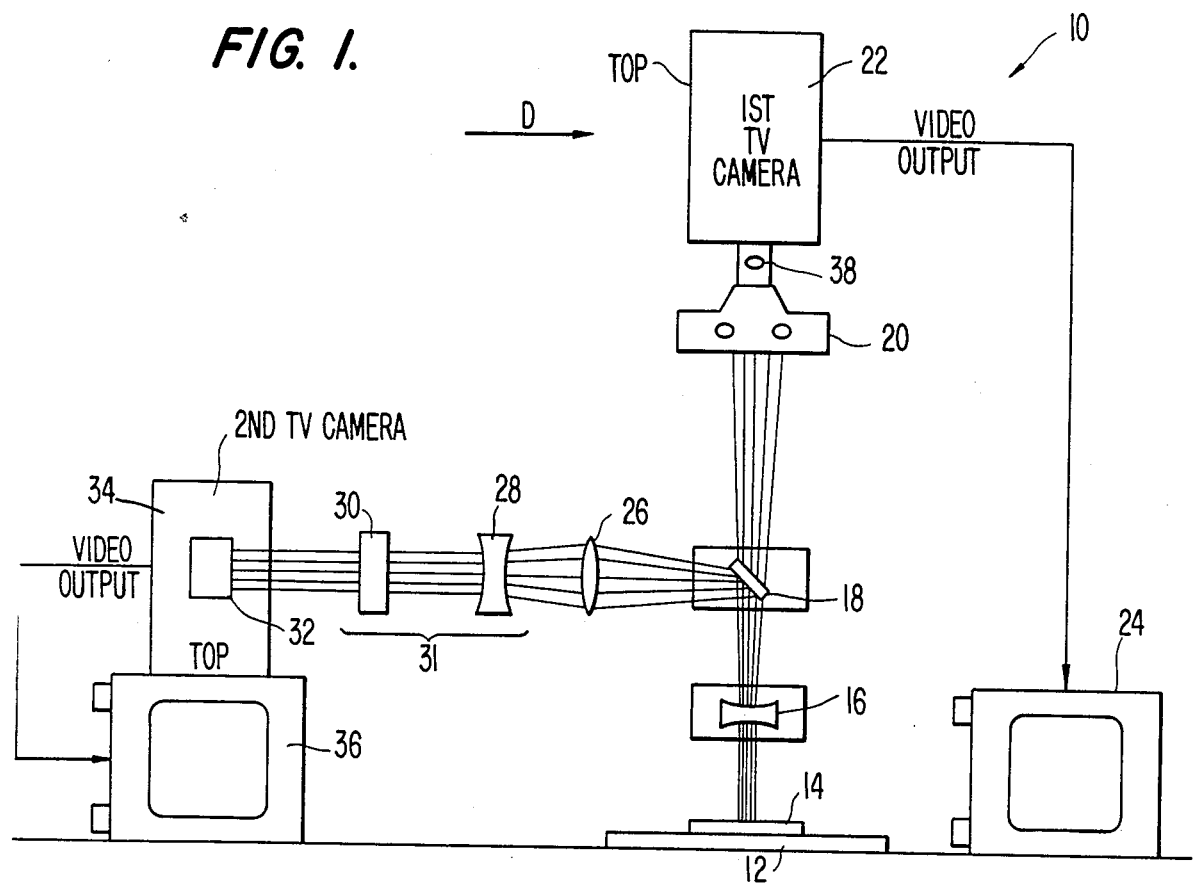
FIG. 1 is a front view of a first embodiment of the microscopic image display system of the present invention.
Figure 2:
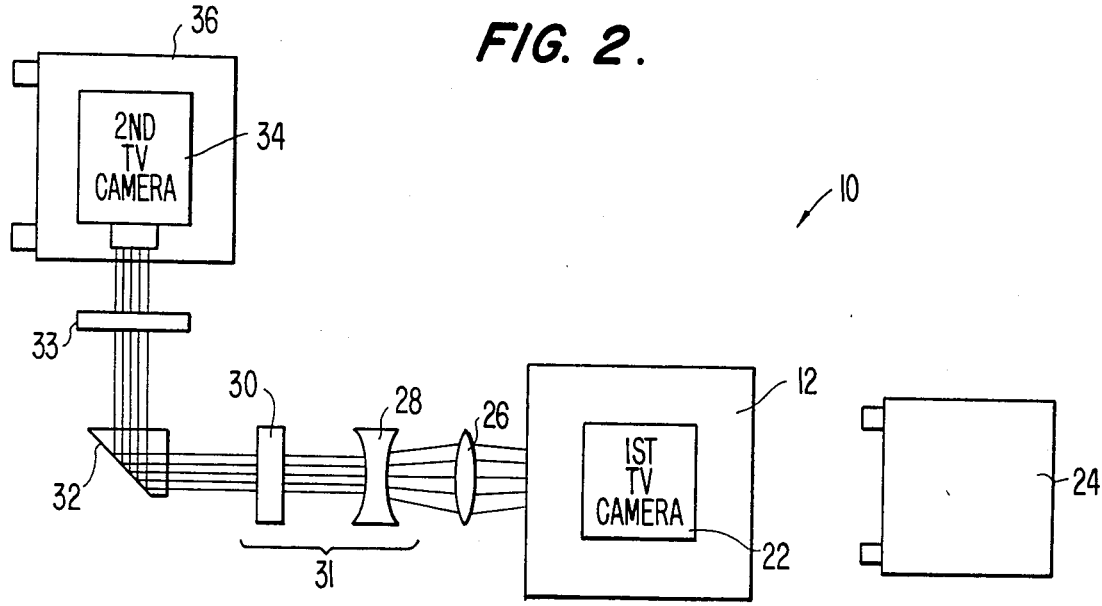
FIG. 2 is a top view of the first embodiment of the microscopic image display system of the present invention.

FIG. 1 is a front view of a first embodiment of the microscopic image display system of the present invention, while FIG. 2 is a top view of the first embodiment of the microscopic image display system. As seen therein, the system 10 comprises a stage 12, specimen slide 14, objective lens 16, splitter 18, trinocular microscope head 20, first camera 22, first TV monitor 24, field (converging) lens 26, diverging lens 28, reduction lens 30, bending prism 32, neutral density filter 33, second TV camera 34, and second TV monitor 36. Diverging lens 28 and reduction lens 30 form a demagnifying lens 31.

The objective 16 is preferably a 100X microscope objective having a high numerical aperture (1.3–1.4). Moreover, the optical output of the objective 16 must be characterized by a 15° divergence.

In accordance with a preferred embodiment of the invention, the amount of image provided as an optical output of the objective 16 covers an area of approximately 700 microns, but an image data area of only 350 microns is desired for display on the monitor 36; moreover, the image area of 350 microns preferably fills the entire display area of the monitor 36. This is accomplished by proper design choice of the following parameters: (1) the distance between the objective 16 and the field lens 26; (2) the distance between the field lens 26 and the lens 38 of camera 22; and (3) the reduction factor, that is, the ratio of the focal length of reduction lens 30 to the focal length of diverging lens 28.

Field lens 26 is preferably a 61 mm. double-convex converging lens measuring 16 (±5) diopters. As is well-known, a diopter is the inverse of the focal length.

Diverging lens 28 is preferably a 102 mm. compound lens, such as a projection lens, which takes converging light (emanating from the field lens 26) and converts it to parallel light.

Reduction lens 30 is preferably a 28 mm. lens, such as is typically employed in a 35 mm. camera, for reducing the parallel light image coming from the diverging lens 28.

Bending prism 32 is any conventional light-bending prism employed for the purpose of bending light coming from reduction lens 30 so as to direct it toward camera 34. In this regard, it is to be noted that a first inversion of the image of the specimen takes place as a result of bending by the splitter 18, whereas a second inversion of the image takes place as a result of bending by the prism 32. It is to be further noted that the camera 34 is disposed in an inverted manner, with its top facing downward (in FIG. 1), whereas the monitor 36 is disposed on its side (as also shown in FIG. 1).

As a result of the latter arrangement, the image viewed on monitor 36 corresponds precisely, in orientation, to that viewed through the microscope directly (via the trinocular microscope head 20). Moreover, the arrangement is such that movement of the slide 14 (and its specimen) in a given direction will result in a movement of the image on monitor 36 in the corresponding direction on monitor 36. Finally, the placement of monitor 36 on its side results in vertical orientation of the scan lines of the monitor, thus, facilitating viewing by the user.

Neutral density filter 33 (preferably, a Kodak Wratten No. 96) is disposed at some point in the optical path to the camera 34, preferably between prism 32 and camera 34 (FIG. 2), to compensate for an increase in light intensity occurring due to reduction in the second optical path.

Figure 3:
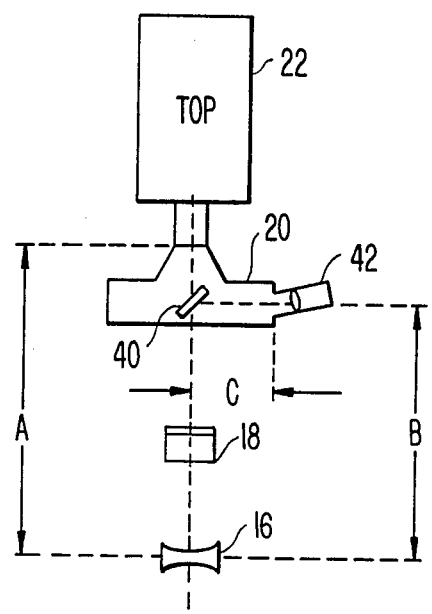
FIG. 3 is a side view of a portion of the microscopic image display system of FIG. 1, as viewed along the arrow D in FIG. 1.

FIG. 3 is a side view of a portion of the first embodiment of the present invention, as viewed along the line D in FIG. 1. As seen in FIG. 1, and as confirmed in FIG. 3, the camera 22 is preferably oriented with its top facing to the left in FIG. 1, while the monitor 24 is disposed on its side. As a result, the specimen as viewed through the trinocular microscope head 20 will correspond precisely in orientation to the view of the specimen displayed on the monitor 24 and viewing is facilitated. As best seen in FIG. 3, the trinocular microscope head 20 provides the user with the capability of viewing the fully magnified (100X) image of the specimen directly, that image being conveyed via the objective 16, splitter 18, further splitter 40 in the trinocular microscope head 20, and binocular viewing arrangement 42. The trinocular microscope head 20 is a conventional item available in the marketplace; for example, such a trinocular microscope head is manufactured by Olympus of Japan.

In order to provide the system with the aforementioned viewing capability, the present invention calls for the mounting of the trinocular microscope head 20, by suitable means, on the end of the camera 22 such that the distance B+C from the objective 16 to the binocular viewing arrangement 42 equals the distance A from the objective 16 to the camera 22 (specifically, the input lens 38 thereof).

Referring to FIGS. 1, 2 and 3, the operation of the system is as follows. The specimen to be viewed is placed on the slide 14, and the slide 14 is placed on the stage 12. The techician then adjusts the slide 14, using the trinocular microscope head 20 or the monitor 36 to view the specimen on slide 14. As mentioned previously, the arrangement is such that movement of the slide 14 in a given direction will result in precisely the same movement of the specimen on the monitor 36.

Once the specimen is properly positioned, the technician views the specimen under a lower magnification power (for example, 20X) on monitor 36 and under a higher magnification power (for example, 100X) on monitor 24. This simultaneous viewing of the specimen under lower and higher magnification powers is achieved without the need for switching of lenses and without any need for refocusing.

Figure 4:
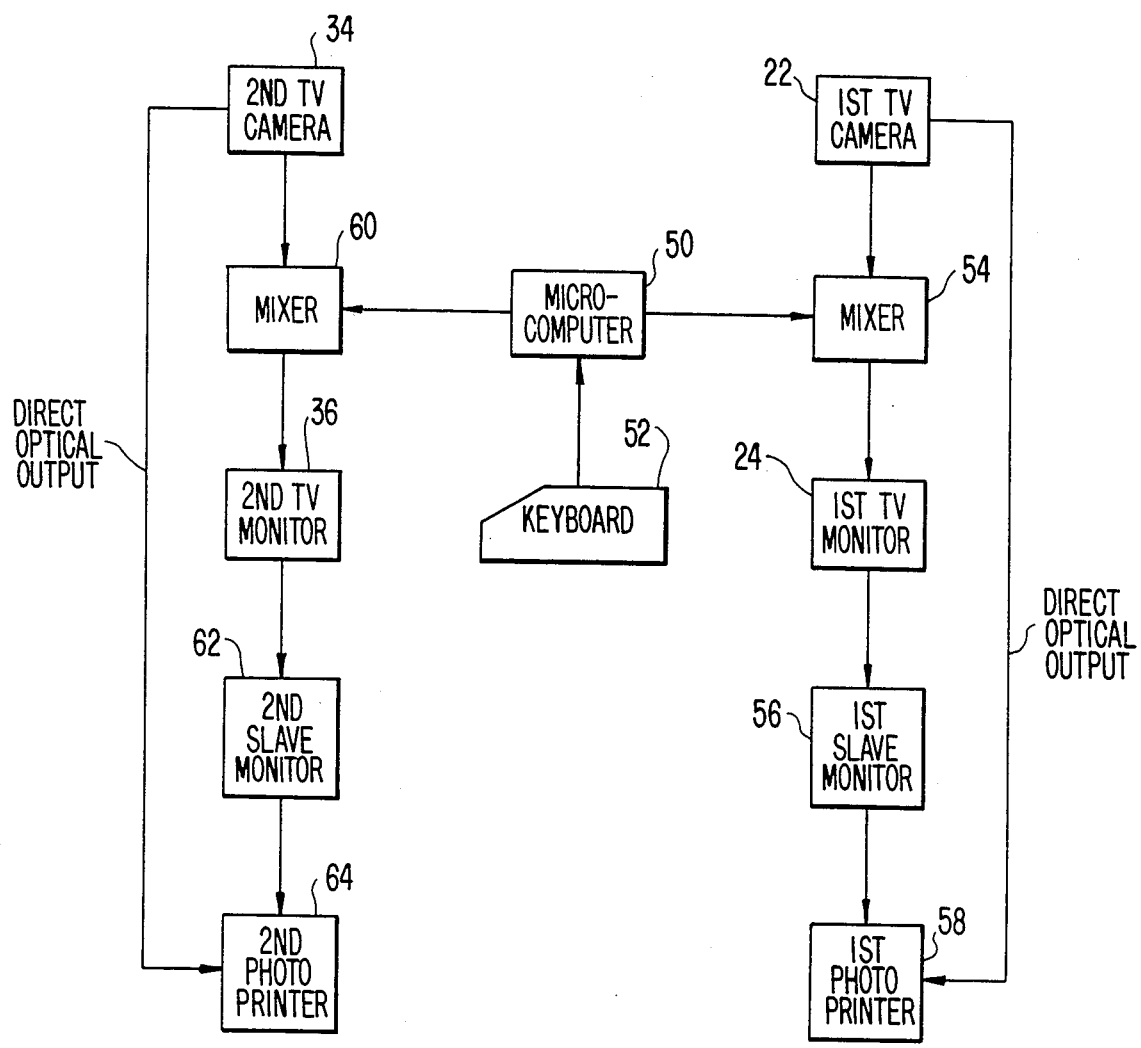
FIG. 4 is a block diagram further disclosing the microscopic image display system of the present invention.

FIG. 4 is a block diagram further disclosing the system of the present invention. As seen therein, the system comprises the previously discussed cameras 22 and 34 and monitors 24 and 36, and further comprises a microcomputer 50, keyboard (or other input means) 52, mixers 54 and 60, slave monitors 56 and 62, and photographic printers 58 and 64.

In operation, in the course of positioning a specimen on the slide 14 (FIG. 1), the technician uses the keyboard 52 to enter information relevant to the specimen into the microcomputer 50, the microcomputer 50 being appropriately programmed and configured to provide analog representations of the entered information to the mixers 54 and 60. As an example, the microcomputer 50 can be configured to include a Video Memory Board MFC-512-8-4-M and an A/D, D/A board MFC-512-8-1-M, manufactured by Imaging Technology, Inc. of Woburn, Mass., for the purpose of generating analog representations of information entered via keyboard 52.

The mixers 54 and 60 are conventional analog mixing devices, available in the marketplace, for mixing the analog video signals from the cameras 22 and 34, respectively, with the analog representations of operator-entered information provided by microcomputer 50, so as to generate a mixed video signal for provision to the monitors 24 and 36, respectively. As a result, monitors 24 and 36 display both the operator-entered information and the image of the specimen.

The system further provides the capability, via photographic printers 58 and 64, of producing a hardcopy record of the image displayed on the monitors 24 and 36, respectively. This can be accomplished in either one of two alternate ways: first, the cameras 22 and 34 can provide a direct optical output to the photographic printers 58 and 64, respectively; or second, slave monitors 56 and 62 can be connected to the output of monitors 24 and 36, respectively, so as to produce appropriate inputs to the photographic printers 58 and 64, respectively. The photographic printers 58 and 64 are, by way of example, implemented by an automatic print processor such as the "47th Street Photo Speed Printer" manufactured by the 47th Street Darkroom Center of New York, N.Y.

Figure 5A:
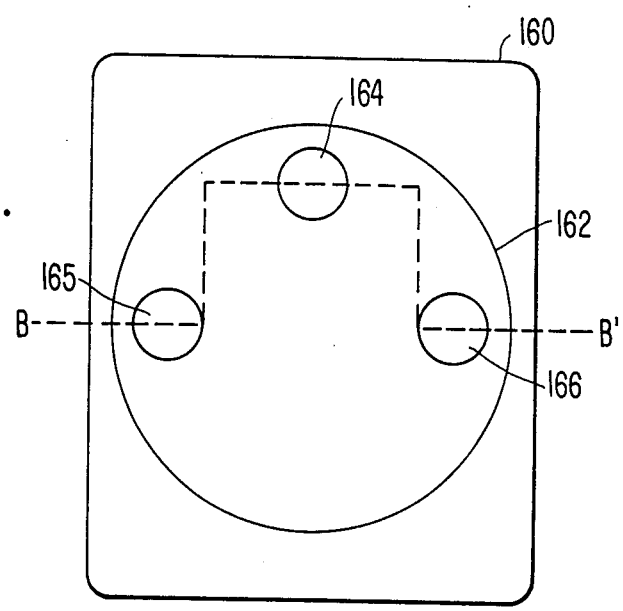
FIGS. 5A and 5B are a top view and a section view (along line B—B' of FIG. 5A), respectively, of a lens switching arrangement employed in accordance with the present invention.
Figure 5B:
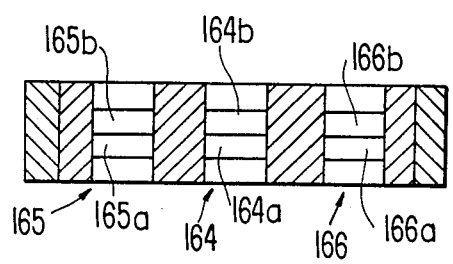

FIGS. 5A and 5B are top and sectional views, respectively, of a lens switching arrangement which can be employed with the system of the present invention. As seen in the figures, the lens switching arrangement comprises a frame member 160 in which a rotatable, circular disc-like member 162 is positioned, member 162 being rotatable within the member 160. The member 162 includes receptacles in which are disposed respective lens arrangements 164, 165 and 166.

More specifically, each of the lens arrangements 164, 165 and 166 has a different magnification power so that, by rotating the member 162 within the frame member 160, lens arrangements of different magnification powers can be moved into position in the optical path, thus providing variable magnification of the object being viewed.

In the prior art, it is well-known to provide a lens switching arrangement wherein lenses of differing magnification may be rotated into position in the optical path. However, a significant drawback to such prior art arrangements resides in the fact that, after rotating each lens into position, it is necessary to refocus the microscope with which the lens switching arrangement is being used.

In accordance with a feature of the present invention, there is no necessity to refocus the microscope when a new lens is switched into position in the optical path. This is due to the fact that, in accordance with the invention, and as seen in FIG. 5B, each lens arrangement 164, 165 and 166 includes a pair of lenses 164a and 164b, 165a and 165b, and 166a and 166b, respectively. More specifically, the present inventor has discovered that, by superimposing positive diopter lenses 164b, 165b and 166b on top of the negative diopter lenses 164a, 165a and 166a, respectively, and by arranging for a predetermined distance to be established between the negative diopter lens and its superimposed positive diopter lens, refocusing of the microscope after each switch to a new lens arrangement is unnecessary.

Accordingly, referring to FIGS. 1, 5A and 5B, in accordance with a further feature of the invention, a lens switching arrangement as shown in FIGS. 5A and 5B can be substituted for the objective lens 16 of FIG. 1. This will provide the microscopic image display system with the capability of switching objective lenses, thus providing the user with further flexibility in the establishment of split-image, multi-power displays.

Further embodiments of the invention will now be described with reference to various figures of the drawings. In the subsequently discussed figures of the drawings, elements identical to those previously discussed above are identified by reference numerals identical to those employed above.

Figure 6:
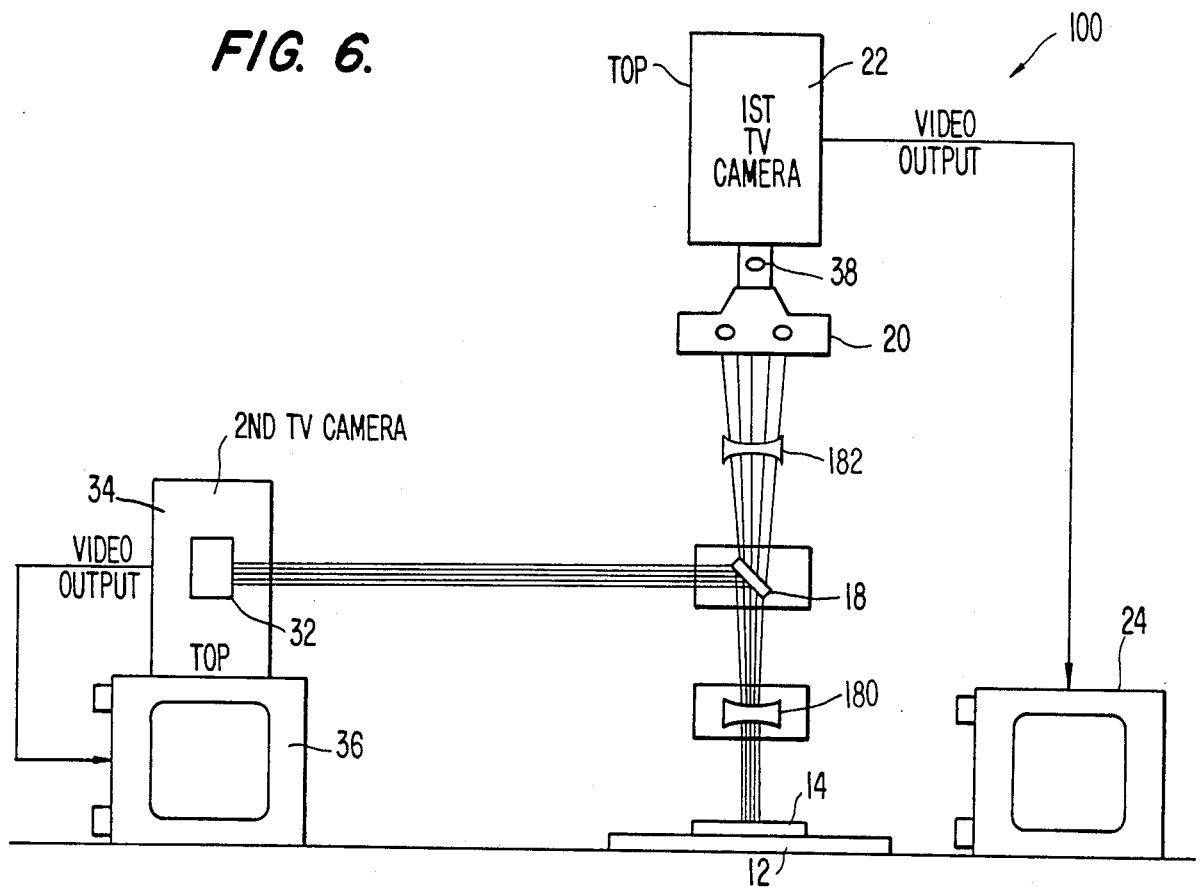
FIG. 6 is a front view of a second embodiment of the microscopic image display system of the present invention.
Figure 7:
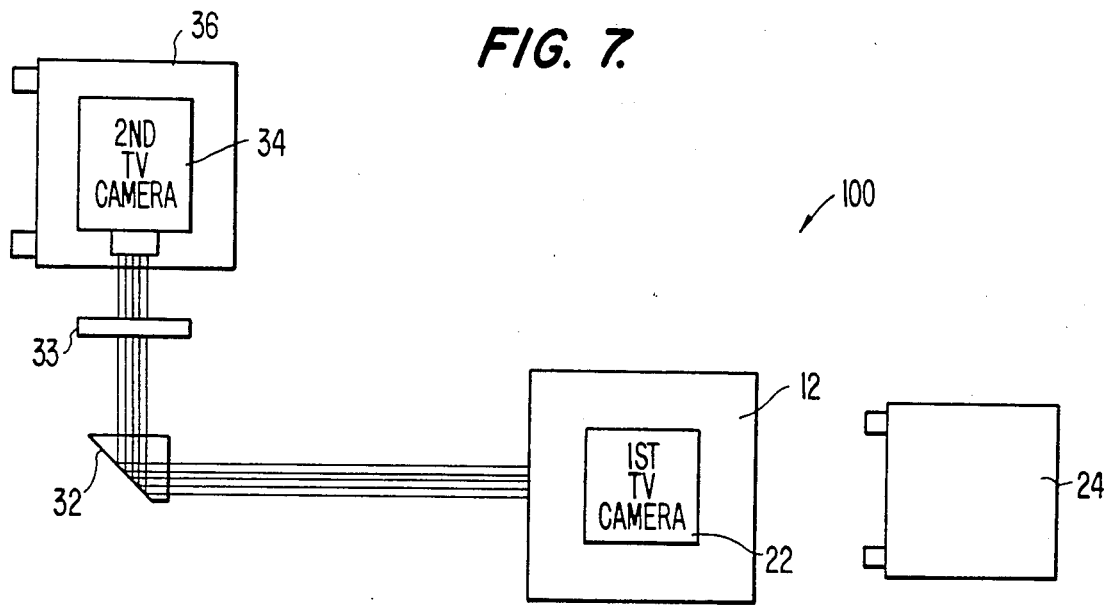
FIG. 7 is a top view of the second embodiment of the microscopic image display system of the present invention.

FIG. 6 is a front view of a second embodiment of the microscope image display system of the present invention, while FIG. 7 is a top view of the second embodiment of the microscopic image display system. The difference between this second embodiment and the first embodiment already discussed resides in the fact that, in the second embodiment, a lower power objective 180 (preferably, a 20X objective or lithography lens) is employed between the specimen 14 and the splitter 18 to produce a relatively low power magnification of the specimen. This magnified image of the specimen is provided, via an optical path which is devoid of any optical elements, to bending prism 32 which directs the magnified image to TV camera 34. As a result, a relatively less magnified image of a larger portion of the specimen is displayed on TV monitor 36.

A further difference between the second embodiment and the first embodiment resides in the fact that, in the second embodiment, the magnified image from objective 180 is provided, via splitter 18, to a magnifying lens 182 (preferably, a 5X diverging lens) in another optical path, the lens 182 further magnifying the already magnified image and providing that further magnified image to the optical input of TV camera 22. As a result, a fully magnified image of a smaller portion of the specimen is displayed on TV monitor 24.

Figure 8:
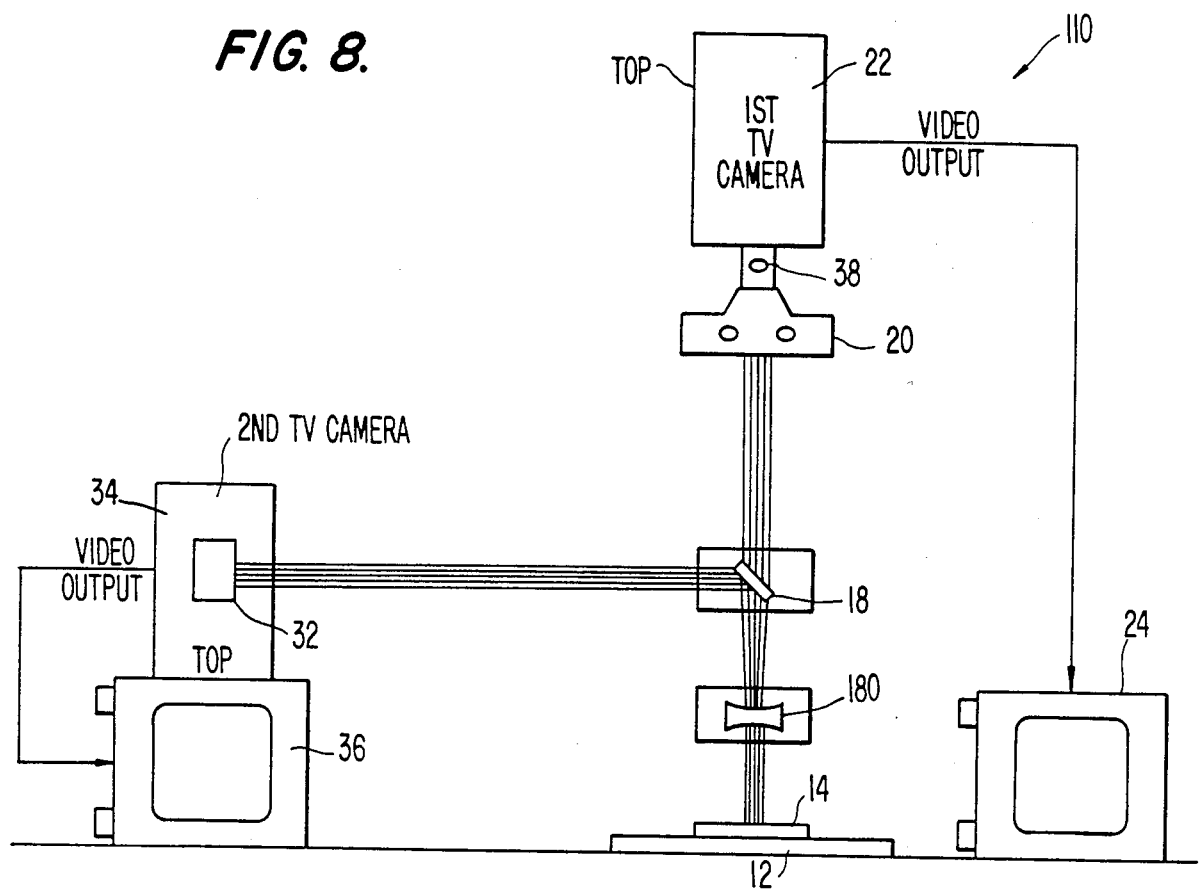
FIG. 8 is a front view of a third embodiment of the microscopic image display system of the present invention.
Figure 9:
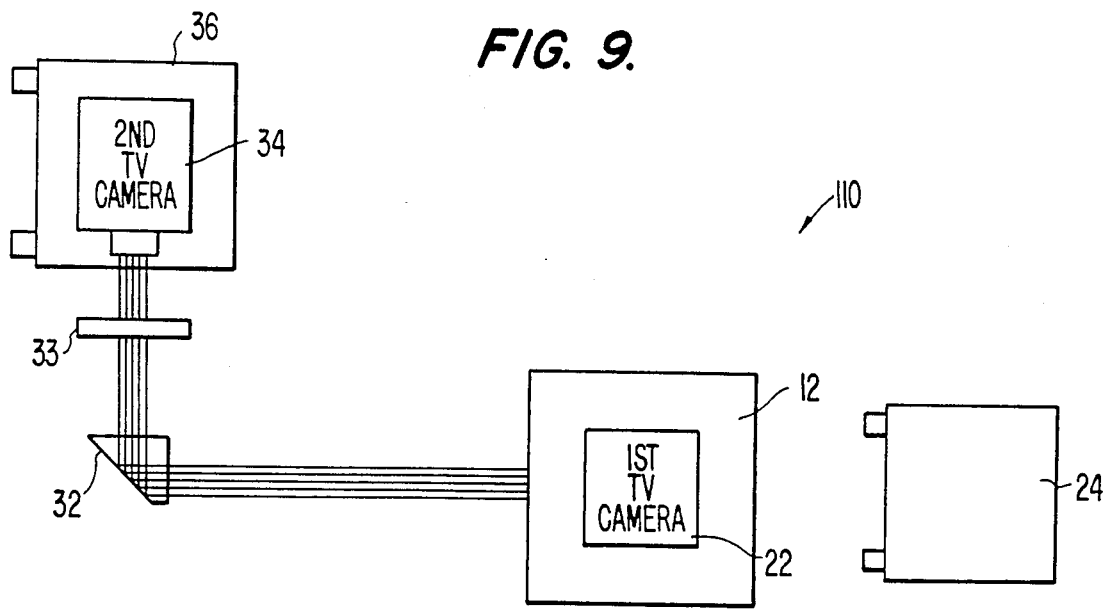
FIG. 9 is a top view of the third embodiment of the microscopic image display system of the present invention.

FIG. 8 is a front view of a third embodiment of the microscopic image display system of the present invention, while FIG. 9 is a top view of the third embodiment of the microscopic image display system. This embodiment of the invention is identical to the second embodiment, discussed above with reference to FIGS. 6 and 7, with one exception. In this embodiment of the invention, the magnifying lens 182 (FIGS. 6 and 7) of the second embodiment is dispensed with. In this embodiment, further magnification of the already magnified image emanating from objective 180 and splitter 18 is achieved by operating TV camera 22 in accordance with an "underscanning" technique.

Most specifically, in accordance with this third embodiment of the invention, the TV camera 22 underscans, preferably by a ratio of 5:1, the already magnified image emanating from objective 180 and provided via splitter 18. This results in a 5:1 magnification of the 20X-magnified image emanating from objective 180 and provided via splitter 18. As a result, a 100X-magnified image of the specimen 14 is displayed on TV monitor 24.

The "underscanning" technique employed in accordance with this embodiment of the invention is carried out by appropriately adjusting the horizontal scan voltage and vertical sweep voltage of the TV camera 22. More specifically, these voltages are adjusted so that the horizontal scan line has a length equal to approximately 0.4472 of its adjusted length, and so that the vertical sweep distance (distance between scan lines) has a value equal to approximately 0.4472 of its unadjusted value. In this manner, TV camera 22 will focus the same number of scan lines on a smaller area, that is, an area equal to one-fifth of its unadjusted value. Although underscanning does result in some loss in resolution, this is compensated by the 5:1 increase in image magnification achieved by underscanning.

Figure 10:
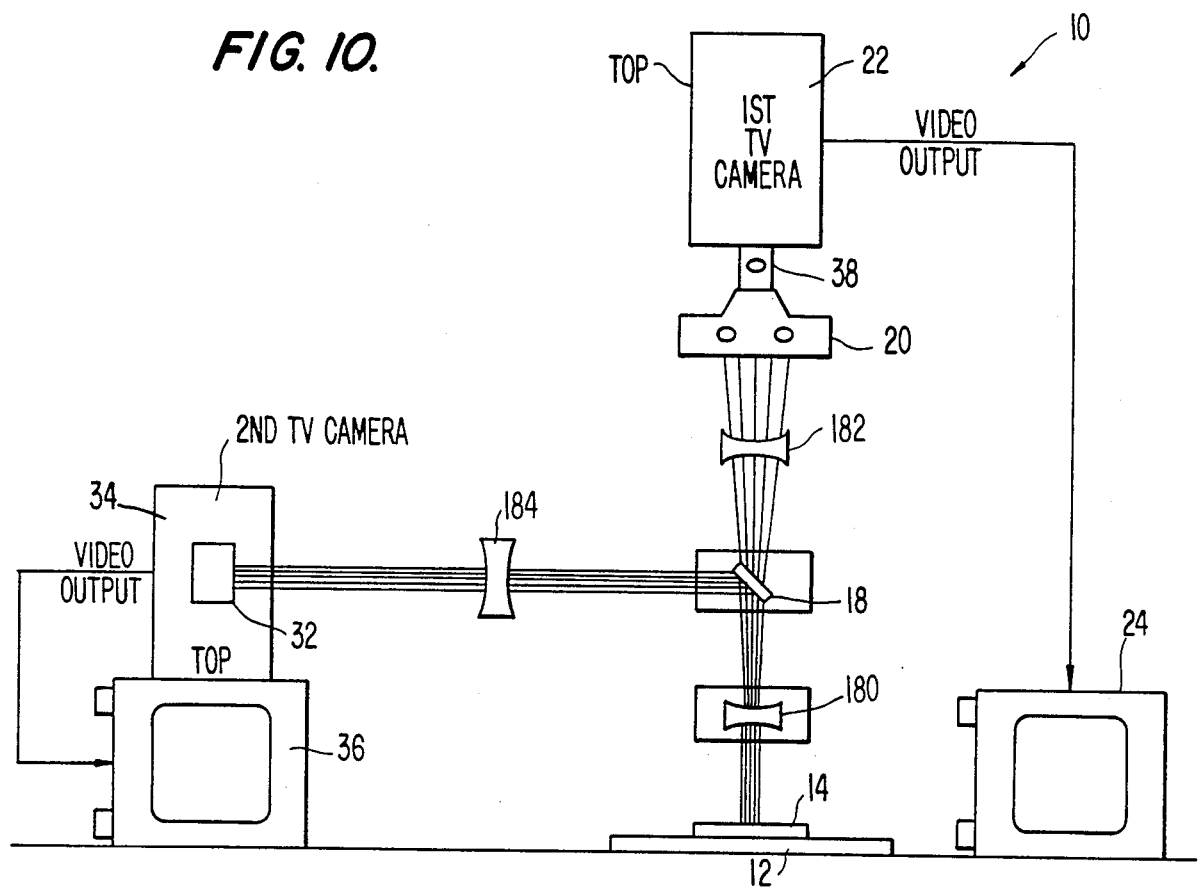
FIG. 10 is a front view of a fourth embodiment of the microscopic image display system of the present invention.
Figure 11:
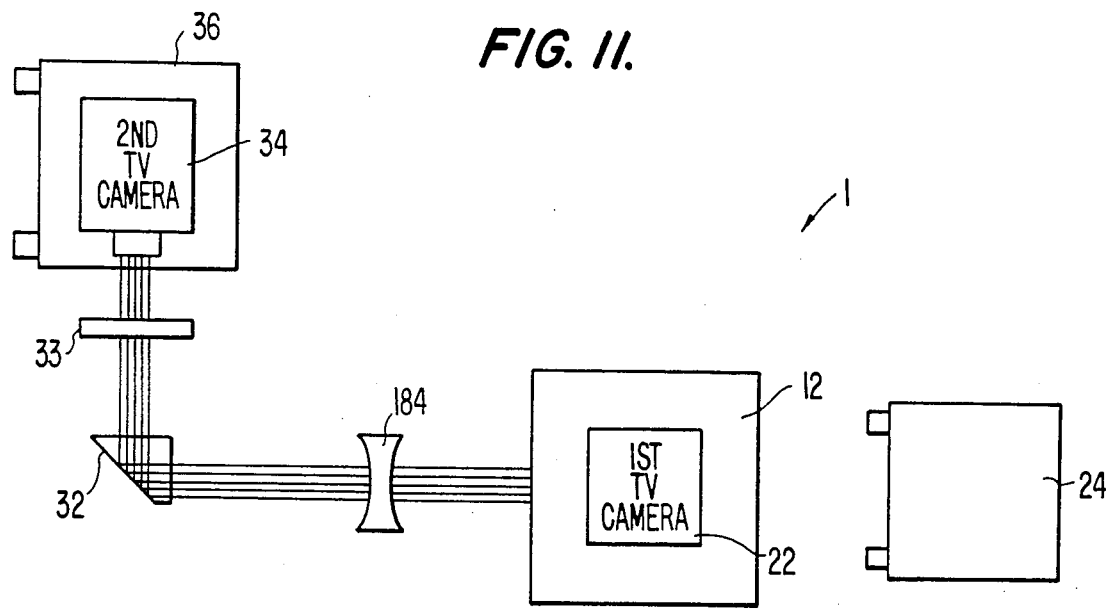
FIG. 11 is a top view of the fourth embodiment of the microscopic image display system of the present invention.

FIG. 10 is a front view of a fourth embodiment of the microscopic image display system of the present invention, while FIG. 11 is a top view of the fourth embodiment of the microscopic image display system. The difference between the fourth embodiment of the invention and the second embodiment of the invention, discussed above with reference to FIGS. 6 and 7, resides in the fact that this embodiment of the invention employs a magnifying lens or Barlow lens 184, the latter being disposed between the objective 180 and the image plane in the second optical path. That is to say, lens 184 is disposed at a point in the vicinity of the point at which lens 26 was disposed in the first embodiment (FIGS. 1 and 2). This results in a lengthening of the optical path and an increase in the focal length. Preferably, lens 184 has a magnification power of 2X or 3X, and thus further magnification of the already magnified image emanating from objective 180 results in production of an image having a magnification of between 40X and 60X. This somewhat further magnified image is displayed on TV monitor 36.

It is to be noted that, in each of the second, third and fourth embodiments discussed above, objective 180 is implemented either by a 20X objective (such as that manufactured by Olympus of Japan) or by a lithography lens having a large field (such as the lithography lens manufactured by Tropel Inc. of Rochester, N.Y.).

It should be also noted that, since each optical element added to an optical path introduces some degree of degradation in that path, the first embodiment of the invention (that of FIGS. 1, 2 and 3) is most preferable since, in that embodiment, optical elements are introduced into the low-power path (the second path) wherein degradation does not have such a great impact on image quality. However, the second, third and fourth embodiments discussed above are also quite feasible and operable in view of the fact that the number of elements introduced into the high-power path (the first optical path) are kept to a bare minimum.

Finally, referring to FIGS. 1, 5A and 5B, as discussed in detail above, in accordance with a further feature of the invention, the lens switching arrangement shown in FIGS. 5A and 5B can be substituted for the objective lens 180 of FIGS. 6 thru 11. This will provide the microscopic image display system with the capability of switching objective lens without the need to refocus each time a new lens is switched into position, and will provide the user with further flexibility in the establishment of split-image, multi-power displays.

It is to be understood that the split-image, multi-power microscope image display systems and methods of the present invention must comply with the Koler technique (well-known in the art) in order to avoid focusing of the filament. In brief, every microscope has a filament which generates light which passes through the objective and is focused by one or more lenses in an objective plane. It is possible, in certain arrangements, to obtain a spurious image resulting from focusing of the filament. In order to avoid this problem, Koler developed lens arrangements and procedures so that the filament image was positioned quite a distance away, and thus was out of focus insofar as the microscopic viewer was concerned.

FIG. 12 is a block diagram or cabling diagram of the interactive microscopic image display system of the present invention. As seen therein, the interactive system basically comprises a computer 200, computer interface circuit 202, a motor driver circuit 204, motors 208 and 210, light source 212, position-detecting potentiometers 216 and 218, position detector circuit 220, read-only memory (ROM) 222, video label overlay circuit 224, disk drive 226, printer 228, and power supplies 230 and 232. Other elements in FIG. 12 have been identified in previous figures, and are correspondingly numbered.

Referring to FIG. 12, it should be noted that the computer 200 can be any conventional microprocessor, and that the various circuits, such as computer interface circuit 202, motor driver circuit 204, position detector 220, ROM 222, overlay circuit 224, and power supply circuit 230, can be implemented as an integral part of an electronics units 234 colocated with the computer 200. The circuits in question can be included in the unit 234 in the form of electronic circuit boards or computer cards.

In operation, computer 200 functions under software control, in accordance with a computer program to be discussed subsequently, to permit the user to enter commands via control keys (for example, the keyboard control keys) for adjusting the position of the microscope stage 12 and providing alphanumeric information for display as a video label. User input commands are provided to computer interface 202, and digital drive signals are provided by interface 202 to motor driver 204. The motor driver 204 provides motor drive pulses via connector 206 to the X motor 208 and the Y motor 210, thus commanding movement of the stage 12 in the X and Y directions, respectively. The instantaneous position of the stage 12 in the X and Y directions is detected by potentiometers 216 and 218, respectively, the latter providing analog position signals via connector 236 to position detector 220. Position detector 220 includes an analog-to-digital converter (ADC), converts the analog signals to digital, and provides digital position signals via interface 202 to the computer 200.

Alphanumeric information for inclusion in the displayed video label is entered via the keyboard (not shown), and corresponding digital label information is provided by the computer 200 to the input (IN) of video label overlay circuit 224. The overlay 224 combines the digital video information at its output OUT with video display signals coming from video camera 222, and the combined video signal is provided to the monitor 24 for integrated display.

Preferably, the system is provided with the capability of mass storage of data in disk drive 226, the latter being connected to the computer 200 via standard serial input-/output interface. In addition, hardcopy output can be produced on a printer 228 also connected to the serial input/output interface of computer 200.

The software operations of the computer 200 are in accordance with a program stored in ROM 222 which, as indicated in FIG. 12, can be implemented in the form of a conventional ROM cartridge; of course, any conventional ROM can be utilized to implement the ROM 222 of the system. Finally, the computer 200 is powered by power supply 232, which can be any conventional power supply associated with the computer 200, while power in the form of direct current (DC) voltages for the other elements and circuits can be provided by a conventional power supply 230.

In the following discussion, a "write" operation will be defined as the transmission of data from the computer 200 to the motor driver 204 via interface 202, while a "read" operation will be defined as the transission of position detection signals from potentiometers 216 and 218 to the computer 200 via position detector 220 and interface 202. During a "write" operation, the computer 200 transmits an eight-bit word to the interface 202, the various bits of the eight-bit word being defined as follows:

D0=1 indicates drive X motor;
D1=1 indicates drive Y motor;

D2=1 indicates forward direction of driving;
D3=1 indicates backward direction of driving;
D4=1 indicates coarse adjustment or movement;
D4=0 indicates fine adjustment or movement; and
D5-D7 are spare bits.

Figure 13B:
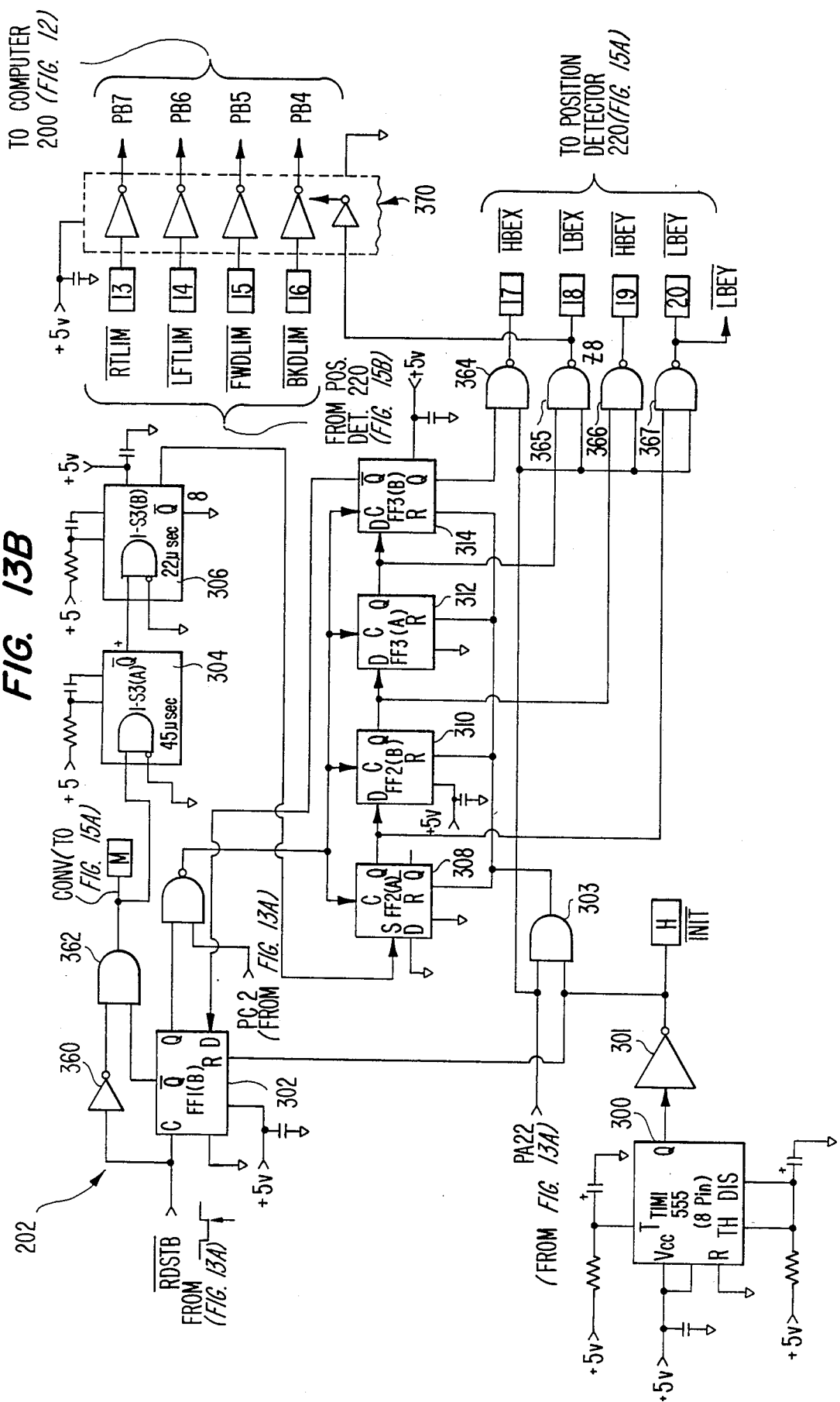
Figure 13C:
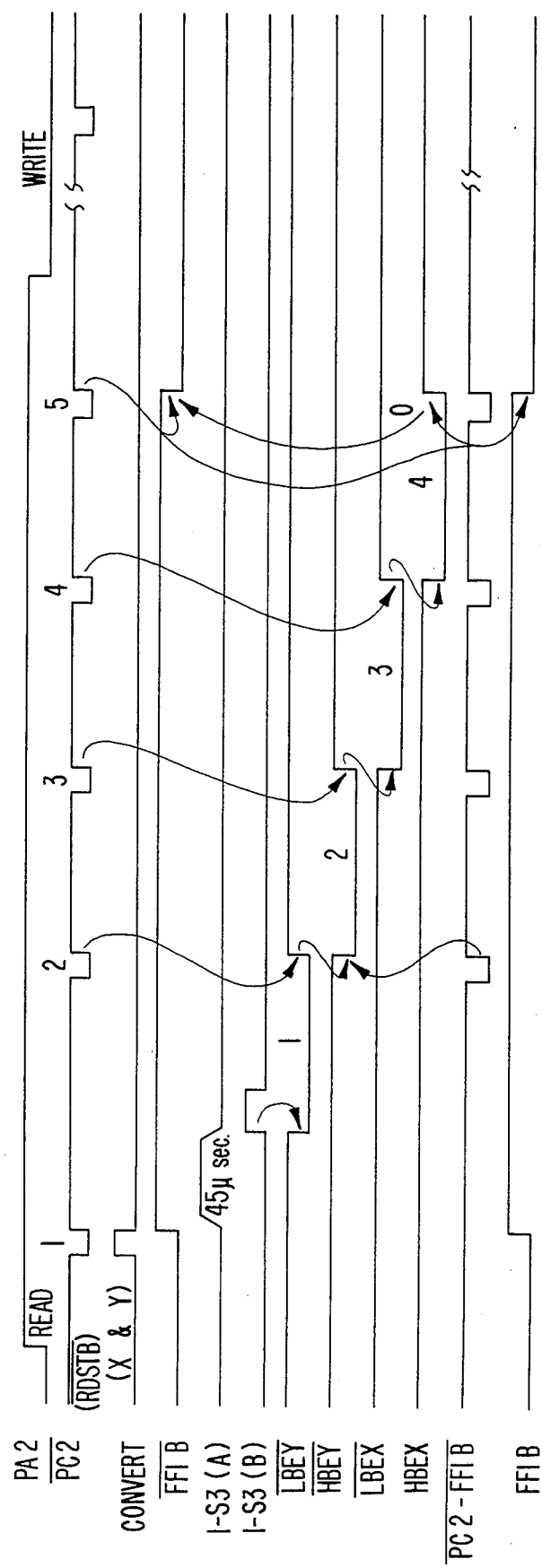
FIG. 13C is a timing diagram relating to the interface circuit of FIGS. 13A and 13B.

FIGS. 13A and 13B are circuit diagrams of the interface 202 of FIG. 12. FIG. 13C is a timing diagram relating to the operations of the interface 202 of FIGS. 13A and 13B.

As seen in FIG. 13B, the interface 202 basically comprises a timer 300, flip-flop 302, one-shot devices 304 and 306, and cascaded flip-flops 308, 310, 312 and 314, as well as associated logic elements as shown. Timer 300 is, preferably, a 555-type timer device manufactured by Signetics, while one-shot devices 304 and 306 are, preferably, dual retriggerable one-shot devices.

When the user presses one of the keyboard control keys to command movement of the stage 12 of FIG. 12, the computer 200 forms the eight-bit word discussed above, and transmits that word to the interface circuit 202 of FIG. 13A via input terminals PB0-PB7. This amounts to a "write" operation, as discussed above, and computer 200 indicates a "write" operation by setting input bit PA2 equal to zero. For the purpose of transmitting data to and through the interface 202, the computer 200 generates a strobe signal PC2 (inverted), and the latter signal goes low periodically when strobing of data is to be carried out. PC2 (inverted) and PA2 are provided via inverters 320 and 322, respectively, to NAND gate 324, and the latter generates the "write strobe" signal WRTSTB (inverted). The latter is provided via inverter 326 as an enable input to AND gate 328. Data inputs PB2 or PB3 are turned on depending on whether forward or backward motion of the stage 12 (FIG. 12) is commanded, and inverters 330 and 332 and NAND gate 334 perform an OR function with respect to these inputs, providing a logical one to the other input of AND gate 328. This results in the formation, by AND gate 328, of the STB1S or "strobe one-shot" output, the latter being sent to the motor driver 204 (FIG. 14B) discussed below.

Inputs PB0 or PB1 are activated depending on whether the X motor or Y motor are to be driven, and the logic arrangement comprising inverters 336 and 338 and AND gates 340 and 343 formulates either signal XMOT or signal YMOT accordingly. The latter signals are provided as inputs to AND gates 344 and 346 (FIG. 13A).

XMOT is AND'ed with XPULSE (a digital pulse provided by the motor driver of FIG. 14B, discussed below) in AND gate 344, and the resulting output is provided to NAND gates 350 and 351. Similarly, YMOT is AND'ed with YPULSE (also provided by the motor driver of FIG. 14B) in AND gate 346, and the resulting output is provided to NAND gates 352 and 353. NAND gates 350 and 353 receive the input FWD via inverter 348, while NAND gates 351 and 352 receive the input FWD (inverted) from inverter 330. NAND gates 350-353 thus form outputs RX (inverted), IX (inverted), IY (inverted) and RY (inverted). These outputs are provided to the motor driver of FIG. 14A (discussed below), and control movement of the stage 12 in the leftward, rightward, forward and backward directions.

Figure 14A:
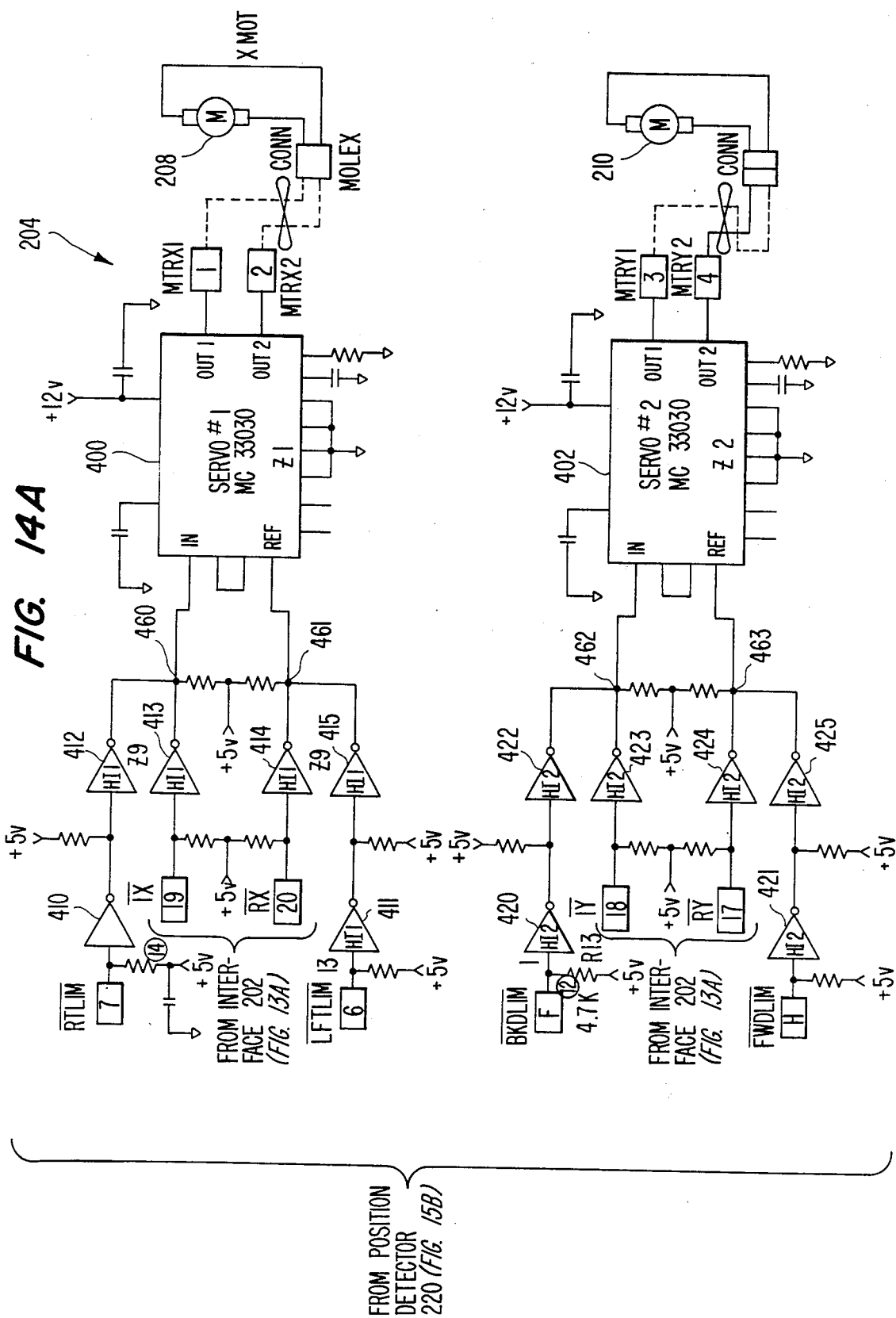
FIGS. 14A and 14B are circuit diagrams of the motor driver of FIG. 12.
Figure 14B:
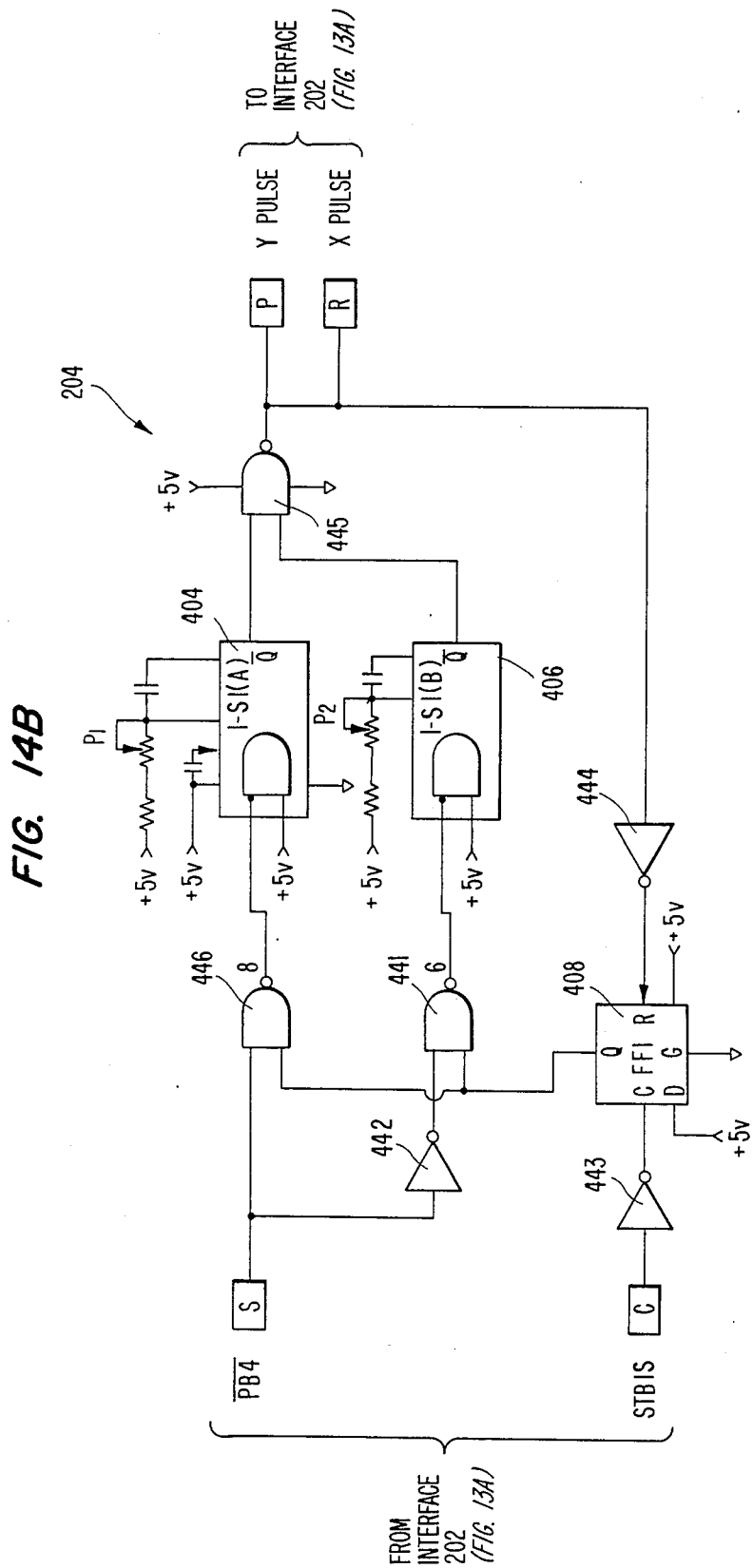

Input PB4 determines whether coarse or fine adjustment or movement of the stage 12 is commanded, inverter 354 providing a corresponding output PB4 (inverted) to the motor driver of FIG. 14B.

The interface circuit 202 of FIGS. 13A and 13B performs a "read" operation in accordance with the timing diagram of FIG. 13C. During such an operation, the input PA2 from the computer is set high, the latter being provided to one input of NAND gate 325, the other input of which receives the computer-generated strobe PC2 via inverter 320. As a result, NAND gate 325 generates RDSTB (inverted), a "read strobe" output provided to the portion of interface 202 shown in FIG. 13B.

Referring to FIG. 13B, when power is initially turned on, timer 300 generates a pulse of predetermined duration which is provided via inverter 301 to AND gate 303, the other input of which is provided with PA22 from inverter 327 of FIG. 13A. AND gate 303 acts like an OR gate, so that a negative pulse output of inverter 301 not only resets flip-flop 302, but also resets flip-flops 308, 310, 312 and 314, all as a part of an initialization process.

Referring back to FIG. 13A, as well as to the timing diagram of FIG. 13C, during a read operation, PA2 is high, and the computer generation of a negative pulse on input PC2 (inverted) results in the generation by NAND gate 325 of a corresponding negative pulse on output RDSTB (inverted). The latter is provided to inverter 360 of FIG. 13B, and as a result AND gate 362 generates a conversion command CONV. This commands the ADC in position detector 220 of FIG. 15A to convert the position detection analog signal to digital form. The output CONV also triggers one-shot 304 which maintains an activated state for a given period of time (preferably, 45 microseconds), after which the second one-shot 306 is triggered, the latter holding its activated state for a second period of time (preferably, 22 microseconds). These delays provide sufficient time for conversion of an analog signal to digital for after which the one-shot 306 sets the flip-flop 308 to an "on" condition. The Q output of flip-flop 308 is provided as an enabling input to NAND gate 367, the latter generating an output LBEY (inverted). Subsequent states of flips-flops 308, 310, 312 and 314 (after this initial set state of 1000) are as follows: 0100, 0010, 0001 and 0000. As the "1" is shifted down the line of cascaded flip-flops, NAND gate 366, 365 and 364 are successively enabled, causing generation of outputs HBEY (inverted), LBEX (inverted) and HBEX (inverted). The four outputs of NAND gates 364-367 are provided to the converters in position detector 220 of FIG. 15A, and result in the transmission to the computer on a successive basis of the lower byte of the Y position information, high byte of the Y position, lower byte of the X position and high byte of the X position, respectively.

To summarize, that portion of the computer interface 202 shown in FIG. 13B controls the conduct of a "read" operation by means of which analog position detection information from the potentiometers 216 and 218 of FIG. 12 is converted to digital form, and the resulting digital information is read in byte portions by the computer 200. Referring back to FIG. 13A, the digital information from the position detector 220 of FIG. 15A is received by the interface 202 of FIG. 13A via input terminals DATIN0-DATIN7, and is provided to the computer 200 via two-way terminals PB0-PB7.

Figure 15B:
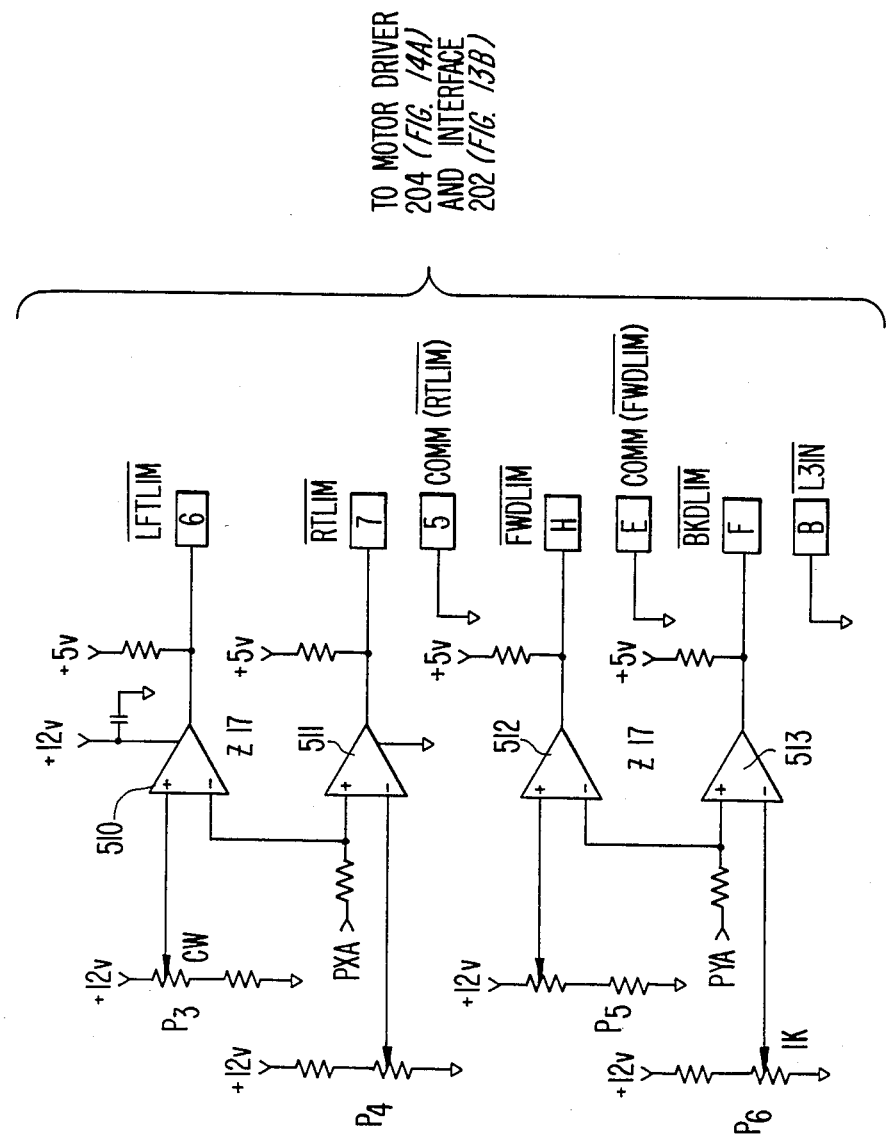

Further referring to FIG. 13B, the circuitry 370 appearing in the upper right corner of FIG. 13B receives and inverts inputs RTLIM (inverted), LFTLIM (inverted), FWDLIM (inverted) and BKDLIM (inverted)

from the position detector of FIG. 15B, and provides the logical inversion output via terminals PB4–PB7 to the computer 200. In this manner, the computer 200 is notified when the stage 12 (FIG. 12) has reached the right, left, forward or backward limits of its range of movement, as determined by the position detector of FIG. 15B in a manner to be described below.

FIGS. 14A and 14B are circuit diagrams of the motor driver 204 of FIG. 12. As seen therein, the motor driver 204 basically comprises servo devices 400 and 402, one-shot devices 404 and 406, and flip-flop 408, and associated logic elements.

Referring to FIG. 14A, inputs RTLIM (inverted) and LFTLIM (inverted) are received from the position detector 220 of FIG. 15B and are provided via inverters 410, 411, 412 and 415 to the IN and REF inputs, respectively, of servo device 400, the latter controlling movement of the X motor 208 of FIG. 12. Inputs IX (inverted) and RX (inverted) are received from the interface 202 of FIG. 13A, and are provided via inverters 413 and 414 to junctions 460 and 461, respectively, with the aforementioned inputs, the junctions 460 and 461 being connected to the IN and REF inputs, respectively, of servo device 400.

Servo device 400 is, preferably, an MC33030 device manufactured by Motorola, and operates in such a manner that a high input at IN and a low input at REF results in rightward movement, a low at IN and a high at REF results in leftward movement, and a low at both IN and REF results in no movement. Furthermore, if either one of the inverters 412 and 413 provides a low output to junction 460, the input to IN of servo device 400 will be low. The same is true of junction 461 with respect to the input REF of the device 400.

Inputs RTLIM (inverted ) and LFTLIM (inverted) will remain high so long as the stage 12 is between limits, but RTLIM (inverted) will go low when the right limit is reached, while LFTLIM (inverted) will go low when the left limit is reached. Moreover, input IX (inverted) will be low and input RX (inverted) will be high when movement of the stage 12 to the right is commanded, and vice versa when movement to the left is commanded. Accordingly, servo device 400 will drive motor 208 so as to move the stage 12 in the rightward direction, as dictated by the outputs of inverters 413 and 414 until the right limit is reached, whereupon point 460 will go low (point 461 already being low), and the servo device 400 will stop. A similar stopping operation will occur during leftward movement when the left limit is reached.

Operation of the lower portion of FIG. 14A corresponds to the operation of the upper portion thereof so that the servo device 402 will, in accordance with the IY (inverted) and RY (inverted) inputs, control the motor 210 so as to move the stage 12 either forward or backward until such time as the corresponding limit is reached, whereupon the servo device 402 will stop the motor 210.

Turning to FIG. 14B, the input PB4 (inverted) from the interface of FIG. 13A will, as previously explained, determine whether movement of the stage 12 will be in large steps (for coarse adjustment) or small steps (for fine adjustment). Input STB1S from the interface 202 of FIG. 13A is provided by inverter 443 to the clock input of flip-flop 408, and triggers flip-flop 408 to the "on" state so that the Q output thereof provided an enabling input to NAND gates 440 and 441. In this manner, one or the other of one-shots 404 or 406 is triggered by its corresponding NAND gate 440 or 441. One-shot 404 produces a pulse of smaller duration (preferably, 5.4 milliseconds), while one-shot 406 produces a pulse of longer duration (preferably, 21 miliseconds), and NAND gate 455 (which performs an OR function) provides the given pulse to the XPULSE and YPULSE outputs, the latter being provided to the interface of FIG. 13A. The pulse output of NAND gate 445 is fed back via inverter 444 to the reset input of flip-flop 408, and thus serves to reset that flip-flop so that it can await reception of another STB1S input via inverter 443. In this manner, a motor-driving pulse of given duration can be selected so as to drive the motor, via the logic elements 344, 346 and 350–353 of FIG. 13A, in a coarse or fine adjustment mode.

FIGS. 15A and 15B are circuit diagrams of the position detector 220 of FIG. 12. As seen therein, the position detector basically comprises op amps 500 and 502, ADC devices 504 and 506, and comparators 510–513.

In operation, the analog signals from the X potentiometer 216 and Y potentiometer 218 are provided to op amps 500 and 502, respectively, the latter preferably being MC1458V op amps manufactured by Motorola. Op amps 500 and 502 are provided with adjustment potentiometers P1 and P2, respectively, the latter being used in order to adjust the operational characteristics of op amps 500 and 502 so as to take full advantage of the electrical range in providing analog signals representing the particular X and Y positions of the stage 12 of FIG. 12. The outputs PXA AND PYA of op amps 500 and 502 accordingly represent an adjusted X-position voltage and an adjusted Y-position voltage, respectively, the latter being provided to the inputs of ADC 504 and 506, respectively, as well as to the further circuitry in FIG. 15B.

ADC 504 and 506 receive the convert command CONV from the interface of FIG. 13B, in response to which the conversion process takes place. ADC devices 504 and 506 also receive HBEX (inverted), LBEX (inverted), HBEY (inverted) and LBEY (inverted) from the interface of FIG. 13B, in response to which ADC 506 provides the lower byte of the Y position information followed by the upper byte of the Y position information to output terminals DATIN0-DATIN7, after which ADC 504 provides the lower byte of the X position information followed by the upper byte of the X position information.

Turning to FIG. 15B, this portion of the position detector 220 of FIG. 12 provides the limit indicators LFTLIM (inverted), RTLIM (inverted), FWDLIM (inverted) and BKDLIM (inverted), indicating that the left limit, right limit, forward limit or backward limit of movement of the stage 12 of FIG. 12 has been reached. Specifically, potentiometers P3 and P4 are used to set the left and right limits of movement of the stage 12, while potentiometers P5 and P6 are used to set the forward and backward limits thereof. Corresponding voltages are provided as inputs to the positive and negative terminals of comparators 510–513. The other inputs of the respective comparators are provided with PXA and PYA, the adjusted X position information and Y position information from the outputs of op amps 500 and 502, respectively, of FIG. 15A. Comparators 510–513 perform their comparison operation, and the occurrence of a negative output at any one of the comparators 510–513 results in the generation of a low output, indicating that the corresponding limit has been reached. Of course, indication that the left limit and forward limit of movement have been reached means that maximum movement to the left front corner of the stage 12 has taken place. The limit outputs of comparators 510-513 are provided to the motor driver 204 of FIG. 14A and, via the circuitry 370 of interface 202 of FIG. 13B, to the computer 200 of FIG. 12.

Figure 16:
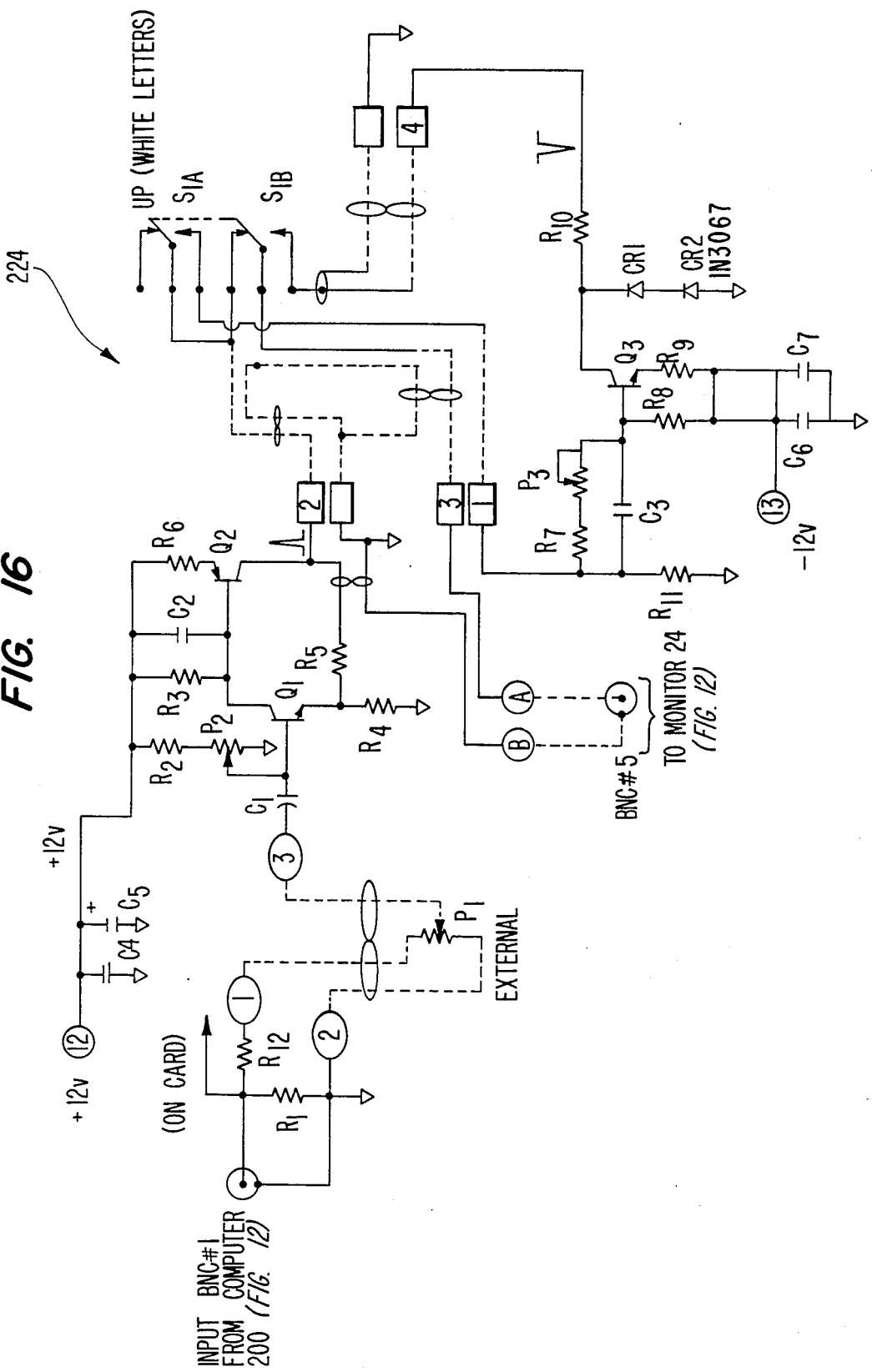
FIG. 16 is a circuit diagram of the video label overlay circuit of FIG. 12.

FIG. 16 is a circuit diagram of the video label overlay circuit 224 of FIG. 12. As seen in FIG. 16, the overlay circuit 224 basically comprises transistors Q1-Q3 and associated elements.

In operation, a composite video signal from the computer 200 of FIG. 12 appears the the input BNC#1 of FIG. 16. This composite video signal is a combination of synchronization data and video data, the video data including pulses defining characters to be displayed on the screen. Potentiometer P1 controls the brightness of the writing to be overlaid on the display screen. The composite video signal is provided, via resistors R1, R12 potentiometer P1 and coupling capacitor C1, to be base of transistor Q1. The base of transistor Q1 is biased via potentiometer P2 in combination with resistor R2, transistor Q1 being biased on so that positive pulses turn on and negative pulses turn off the transistor Q1. In this application, data comprises positive pulses while sync signals comprise negative pulses.

The pulses applied to transistor Q1 appear as output pulses on resistor R3, and transistor Q2, which has its base connected to the collector of transistor Q1, acts as a current source with negative voltage at its base. As a result, transistor Q2 produces positive current spikes which are sent to switch S1A-S1B.

Switch S1A-S1B, in its upper position, provides positive current spikes via output BNC#5 to the display screen of the monitor 24 of FIG. 12, the video signal from video camera 22 of FIG. 12 being combined with the positive current spikes at output BNC #5. The positive current spikes represent white letters on a dark background for display with the video output of camera 22 of FIG. 12.

If switch S1A-S1B is in its lower position, the positive current spikes are provided to transistor Q3 and its associated elements. Resistor R11 is a damping resistor, capacitor C3 is a coupling capacitor for providing AC input to the base of transistor Q3, and potentiometer P3 is adjusted so as to bias transistor Q3 for negative spikes. As a result, transistor Q3 provides negative current spikes via resistor R10 (a buffer resistor) through switch S1B to the output BNC #5, where the negative current spikes are combined with the video signal from camera 22. The combined video signal and negative current spikes (representing black letters on a white field) are provided to the monitor 24 for display.

Figure 17B:
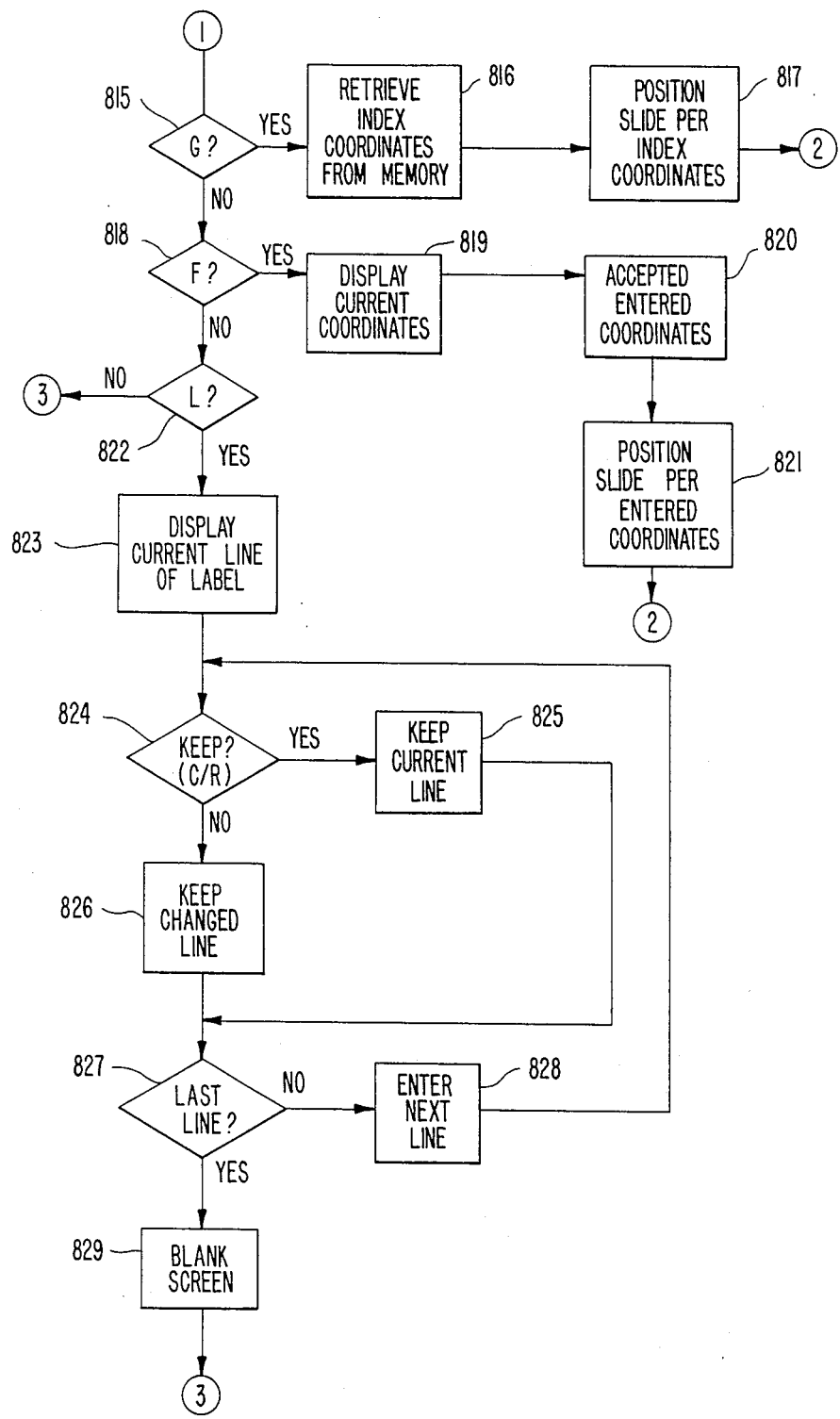
Figure 17C:
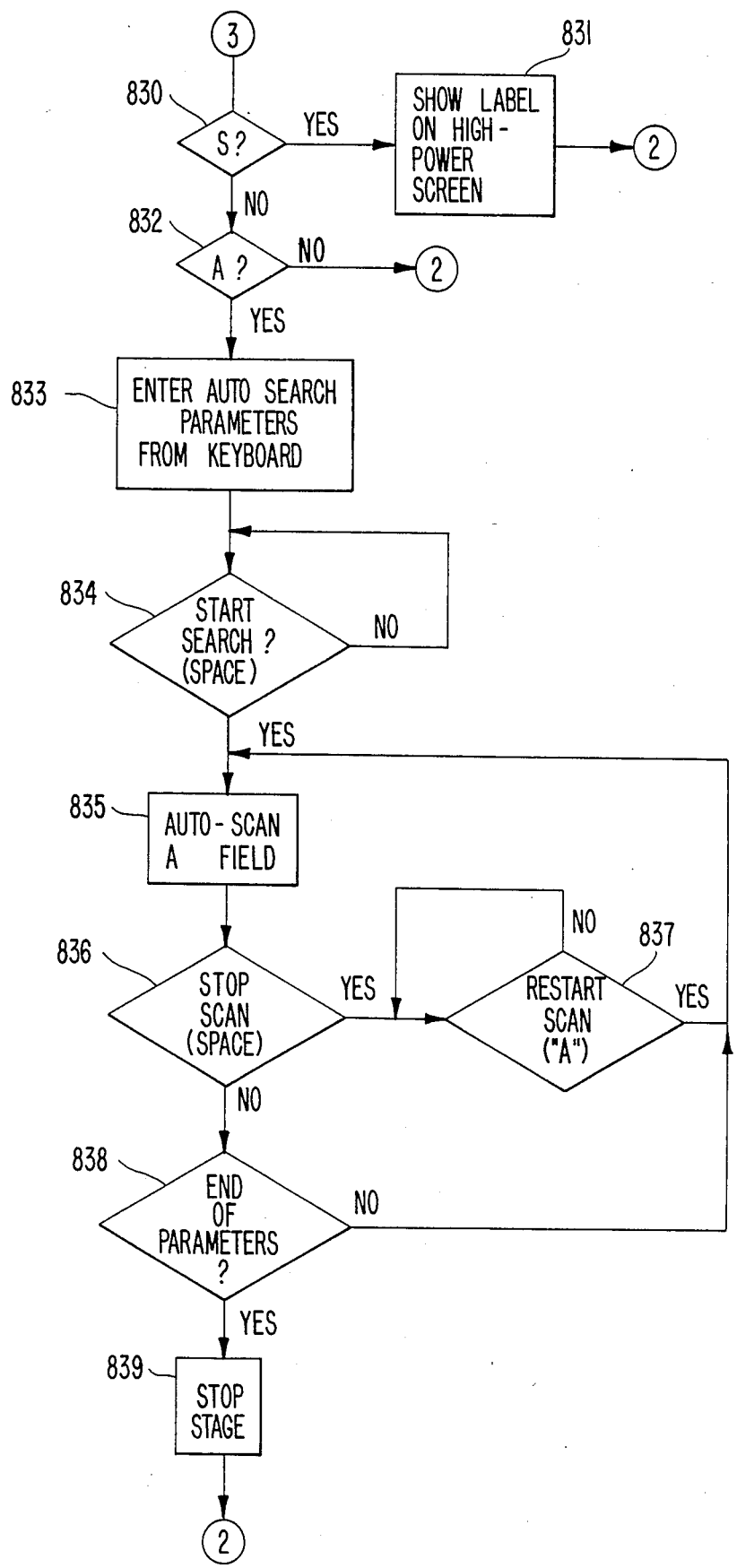

FIGS. 17A-17C are a flowchart of the operations performed by the computer 200 of FIG. 12. When the user first turns on the computer and display screens, one of the screens (preferably, the high power display) displays the initial menu (block 800). Various options are presented to the user. Specifically, the user can type an "H" on the keyboard, and the slide will be moved to a "home" position; for example, the stage will be moved so that the right rear corner of the slide is under the objective lens (block 801-802).

If the user types a "C", a routine for changing parameters of the system will be entered (blocks 803-804), and a separate menu will be displayed for this purpose. In this manner, such parameters as the objective lens size, number of steps per field, number of steps per strip, and so forth can be changed.

If an "M" is typed, a second screen or menu will be displayed (blocks 805-806). Various additional options are presented in the second menu.

For example, if the user types a "B", the "help" prompts appearing on the screen will be blanked (blocks 807-808). Conversely, if a "D" is typed, the "help" prompts will be displayed or redisplayed (blocks 809-810).

If a "P" is typed (blocks 811-812), the index coordinates (X and Y coordinates) of the lens with respect to the slide, and thus of any object appearing in the center of the lens, will be displayed on one of the monitors (preferably, the high power monitor).

If a "K" is typed (blocks 813-814), indicating that the user wants to keep the current coordinates, the current coordinates will be stored in the memory of the system.

If a "G" is typed (blocks 815-817), indicating that the user wants to "get" or retrieve the coordinates from memory, the coordinates will be retrieved from memory, and the slide will be automatically positioned to the new coordinates.

If an "F" is typed (blocks 818-820), indicating that the user wants to "find" certain coordinates, the current coordinates will be displayed. If new coordinates are entered at this time, the stage will be positioned in accordance with the entered coordinates.

If an "L" is typed, the system will display the first line of the current label on the monitor (blocks 822-823). At this point, a carriage return can be typed, indicating that this current line should be kept (blocks 824-825). If, however, the line is to be changed, the user merely types a new line before typing a carriage return, and this new line will be stored (block 826). As each line is kept or changed, the system will determine whether or not this is the last line. If not, a new line will be entered (blocks 827-828), and the procedure will be repeated. If the last line has been reached, the screen will be blanked (block 829).

A further option is presented by user entry of an "S", in which case the label will be displayed on the screen of one of the monitors (blocks 830-831). Entry of an "A" indicates desire to enter the "autosearch" routine, and this will be discussed below. It should be noted that any of the operations related to the entry of a B, D, P, K, G, F, L or S will result in the return of control to the second screen menu (block 806).

With respect to the autosearch routine, autosearch parameters may be entered from the keyboard by the user (block 833). Such parameters include the number of fields from left to right or right to left which are to be searched, the time duration for which each field is to be displayed prior to going on to the next field, the number of strips to be searched (that is, the number of horizontal rows), and so forth. The search is then started by pressing of the spacebar on the keyboard (block 834). The system scans in accordance with the above parameters (block 835), but can be stopped at any time by pressing of the spacebar (block 836). In the event that the scan is stopped, it can be restarted by pressing an "A" (block 837). Once the number of fields and strips have been traversed (block 838), the stage stops and delays before beginning to scan in the opposite direction (block 839). Control is then returned to the second screen menu (block 806), whereupon the various options discussed above with respect to the second menu can be utilized by the user to further manipulate the system.

While preferred forms and arrangements have been shown in illustrating the invention, it is to be understood that various changes in detail and arrangement may be made without departing from the spirit and scope of this disclosure.

We claim:

1. A system for interactively displaying magnified images of an object in accordance with different respective magnifications, comprising:

stage means for holding the object;

objective means for magnifying an image of the object so as to produce an objective optical output having a given magnification;

splitting means for splitting the objective optical output into a first optical output and a second optical output for passage through respective first and second optical paths;

first camera means disposed in the first optical path for producing a first video output;

second camera means disposed in the second optical path for producing a second video output;

adjusting means disposed in at least one of the first and second optical paths for adjusting the magnification of at least one of the first optical output in the first optical path and the second optical output in the second optical path so that the magnification of the object in the first optical path differs from the magnification of the object in the second optical path;

display means responsive to said first and second video outputs for displaying first and second images, respectively, of the object magnified in accordance with the different respective magnifications;

operator interactive means for entering operator inputs commanding relative movement of at least one of said first and second images of the object as displayed by said display means; and movement control means connected to said operator interactive means and responsive to said operator inputs for moving said at least one of said first and second images of the object as displayed by said display means.

2. The system of claim 1, further comprising video overlay means disposed between at least one of said first and second camera means and said display means, and responsive to an operator input comprising alphanumeric information to be displayed for inserting said alphanumeric information into at least one of said first and second video outputs for display with at least one of said first and second images.

3. The system of claim 2, further comprising selection means for operator selection between display of white letters on black background and black letters on white background.

4. The system of claim 2, wherein said stage means comprises a microscope stage, and said movement control means comprises a computer and a motor driver connected between said computer and said microscopes stage.

5. The system of claim 3, wherein said operator interactive means comprises a keyboard connected to said computer.

6. The system of claim 4, wherein said operator inputs include at least one of forward, backward, left and right movement commands, said computer being responsive thereto for generating movement commands, said motor driver being responsive to said movement commands for moving said microscope stage accordingly.

7. The system of claim 6, wherein said motor driver includes two motors connected to said microscope stage, one of said motors controlling forward and backward movement of said microscope stage, the other of said motors controlling left and right movement of said microscope stage.

8. The system of claim 4, wherein said operator inputs include coarse movement and fine movement commands, said computer being responsive thereto for generating corresponding coarse and fine movement signals, said motor driver being responsive to said coarse and fine movement signals for moving said microscope stage accordingly.

9. The system of claim 8, wherein said motor driver includes two drive pulse generators, one of said drive pulse generators controlling coarse movement of said microscope stage, and the other of said drive pulse generators controlling fine movement of said microscope stage.

10. The system of claim 4, further comprising video overlay means disposed between at least one of said first and second camera means and said display means, and responsive to an operator input comprising alphanumeric information to be displayed for inserting said alphanumeric information into at least one of said first and second video outputs for display with at least one of said first and second images.

11. The system of claim 10, further comprising selection means for operator selection between display of white letters on black background and black letters on white background.

12. The system of claim 8, further comprising position detection means associated with said microscope stage for determining the position of said microscope stage, and for providing corresponding position signals to said computer.

13. The system of claim 12, wherein said computer is responsive to said position signals from said position detection means for comparing the present position of said microscope stage to predetermined position limits thereof, said computer generating a limit signal whenever any of said predetermined position limits are reached by said microscope stage.

14. The system of claim 13, wherein said motor driver is responsive to said limit signal generated by said computer for stopping movement of said microscope stage.

15. A method for interactively displaying magnified images of an object in accordance with different respective magnifications, comprising the steps of:

providing a stage for holding the object;

magnifying an image of the object so as to produce an objective optical output having a given magnification;

splitting the objective optical output into a first optical output and a second optical output for passage through respective first and second optical paths;

adjusting the magnification of at least one of the first optical output in the first optical path and the second optical output in the second optical path so that the magnification of the object in the first optical path differs from the magnification of the object in the second optical path;

displaying first and second images, respectively, of the object magnified in accordance with the different respective magnifications;

entering operator inputs commanding relative movement of at least one of the first and second images of the object as displayed; and moving said at least one of said first and second images of the object as displayed.

16. The method of claim 15, wherein said operator inputs include at least one of forward, backward, left and right movement commands.

17. The method of claim 15, wherein said operator inputs include coarse and fine movement commands.

18. The method of claim 15, further comprising the step of determining the position of the stage, comparing the position of the stage to predetermined position limits, and stopping movement of the stage when the predetermined position limits are reached.

19. The method of claim 15, wherein said operator inputs include alphanumeric information to be displayed with at least one of the first and second images, said method comprising the further step of displaying the alphanumeric information with said at least one of the first and second images.

20. The method of claim 19, further comprising the step of selecting between display of the alphanumeric information in accordance with a black-on-white or a white-on-black protocol.

21. A system for interactively viewing in detail a selected portion of an object, comprising:
first camera means disposed at an output end of a first optical path for providing a first video output;
second camera means disposed at an output end of a second optical path for providing a second video output;
producing means disposed in at least one of the first optical path and the second optical path for producing, as an output of the first optical path, a first image of the object magnified in accordance with a first magnification, and for producing, as an output of the second optical path, a second image of the object magnified in accordance with a second magnification greater then the first magnification;
first display means connected to said first camera means for receiving said first video output and responsive thereto for displaying the first image of the object;
second display means connected to said second camera means for receiving said second video output and responsive thereto for displaying the second image of the object; and
manipulating means for manipulating the first image on the first display means so as to move the selected portion of the object into a predetermined portion of the first display means;
whereby the selected portion of the object appears in the second image and is displayed and viewed in detail on the second display means.

22. The system of claim 21, wherein said system further comprises stage means for holding the object, and wherein said manipulating means comprises a stage mover connected to said stage means for moving said stage means, thereby moving the object held by said stage means.

23. The system of claim 22, wherein said stage mover includes two motors connected to said stage means, one of said motors controlling said stage means along a first axis and the other of said motors controlling movement of said stage means along a second axis.

24. The system of claim 22, wherein said stage mover moves said stage means selectively in large increments of distance and in small increments of distance.

25. A method for interactively viewing in detail a selected portion of an object, comprising the steps of:
producing a first image of the object magnified in accordance with a first magnification;
producing a second image of the object magnified in accordance with a second magnification greater than the first magnification;
providing a first optical path, at an output end of which a first camera is disposed;
providing a second optical path, at an output end of which a second camera is disposed;
providing the first image as an output of the first optical path;
providing the second image as an output of the second optical path;
operating the first camera to provide a first video output, corresponding to the first image, to a first display screen;
operating the second camera to provide a second video output, corresponding to the second image, to a second display screen;
manipulating the first image on the first display screen so as to move a selected portion of the object into a predetermined portion of the first display screen; and
viewing the selected portion of the object, as part of the second image, in detail on the second display screen.

26. The method of claim 25, wherein the object is intially positioned on a stage, and wherein said manipulating step comprises moving the stage and the object.

27. The method of claim 26, wherein the stage is moved first in large increments of distance and then in small increments of distance.

28. The method of claim 26, wherein the stage is moved in directions corresponding to at least two axes of movement.

* * * * *

UNITED STATES PATENT AND TRADEMARK OFFICE
CERTIFICATE OF CORRECTION

PATENT NO. : 4,769,698

DATED : September 6, 1988

INVENTOR(S) : Robert S. Ledley

It is certified that error appears in the above-identified patent and that said Letters Patent is hereby corrected as shown below:

In claim 4, column 17, line 53, "2" should be "1".

In claim 5, column 17, line 58, "3" should be "4".

In claim 12, column 18, line 30, "8" should be "4".

Signed and Sealed this

Twenty-ninth Day of May, 1990

*Attest:*

HARRY F. MANBECK, JR.

*Attesting Officer*  *Commissioner of Patents and Trademarks*